US012021785B2

(12) United States Patent
Xu et al.

(10) Patent No.: US 12,021,785 B2
(45) **Date of Patent: *Jun. 25, 2024**

(54) FEEDBACK INFORMATION PROCESSING METHOD, DEVICE AND SYSTEM

(71) Applicant: ZTE Corporation, Guangdong (CN)

(72) Inventors: Jun Xu, Guangdong (CN); Yu Ngok Li, Guangdong (CN); Bo Dai, Guangdong (CN); Yuxin Wang, Guangdong (CN); Jin Xu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 412 days.

This patent is subject to a terminal disclaimer.

(21) Appl. No.: 17/328,847

(22) Filed: May 24, 2021

(65) Prior Publication Data

US 2022/0052823 A1 Feb. 17, 2022

Related U.S. Application Data

(63) Continuation of application No. 16/574,483, filed on Sep. 18, 2019, now Pat. No. 11,018,835, which is a (Continued)

(30) Foreign Application Priority Data

Apr. 30, 2014 (CN) ......................... 201410182804.8

(51) Int. Cl.
*H04L 5/00* (2006.01)
*H04L 1/00* (2006.01)
(Continued)

(52) U.S. Cl.
CPC .......... *H04L 5/0055* (2013.01); *H04L 1/0003* (2013.01); *H04L 1/0005* (2013.01);
(Continued)

(58) Field of Classification Search
CPC ... H04L 1/0003; H04L 1/0005; H04L 1/0011; H04L 1/0021; H04L 1/0026;
(Continued)

(56) References Cited

U.S. PATENT DOCUMENTS 8,259,698 B2 9/2012 Park
9,432,168 B2 * 8/2016 Kim ..................... H04L 1/0005
(Continued)

FOREIGN PATENT DOCUMENTS

CN 101364858 A 2/2009
CN 101631007 A * 1/2010
(Continued)

OTHER PUBLICATIONS

European Search Report issued in EP Patent Application No. 22212346.5, dated Mar. 28, 2023, 7 pages.

*Primary Examiner* — Shah M Rahman
(74) *Attorney, Agent, or Firm* — Perkins Coie LLP

(57) ABSTRACT

Provided are a method, apparatus and system for processing feedback information. The method includes, the first transmission node receiving a signal of a data shared channel, and determining data transmission level indication information of a transport block according to the signal; and the first transmission node transmitting the data transmission level indication information corresponding to the transport block to a second transmission node.

18 Claims, 8 Drawing Sheets

Related U.S. Application Data continuation of application No. 15/306,763, filed as application No. PCT/CN2014/084120 on Aug. 11, 2014, now Pat. No. 10,498,515.

(51) Int. Cl.

| | |
|---|---|
| ***H04L 1/1607*** | (2023.01) |
| ***H04L 1/1812*** | (2023.01) |
| ***H04L 1/20*** | (2006.01) |
| ***H04W 72/0446*** | (2023.01) |

(52) U.S. Cl.

CPC .......... *H04L 1/0011* (2013.01); *H04L 1/0021* (2013.01); *H04L 1/0026* (2013.01); *H04L 1/0028* (2013.01); *H04L 1/0035* (2013.01); *H04L 1/1671* (2013.01); *H04L 1/1692* (2013.01); *H04L 1/1812* (2013.01); *H04L 1/20* (2013.01); *H04L 1/203* (2013.01); *H04L 5/0048* (2013.01); *H04L 5/0057* (2013.01); *H04W 72/0446* (2013.01)

(58) Field of Classification Search

CPC ... H04L 1/0028; H04L 1/0035; H04L 1/1671; H04L 1/1692; H04L 1/1812; H04L 1/20; H04L 1/203; H04L 5/0048; H04L 5/0055; H04L 5/0057; H04W 72/0446

See application file for complete search history.

(56) References Cited

U.S. PATENT DOCUMENTS

| | | | | |
|---|---|---|---|---|
| 2003/0081692 | A1 | 5/2003 | Kwan et al. | |
| 2008/0095185 | A1* | 4/2008 | DiGirolamo | H04L 1/0026 370/464 |
| 2009/0040998 | A1* | 2/2009 | Park | H04L 1/1671 370/345 |
| 2009/0067528 | A1* | 3/2009 | Loh | H04L 1/0625 375/267 |
| 2009/0098823 | A1* | 4/2009 | Miyamoto | H04L 1/20 455/9 |
| 2009/0201825 | A1* | 8/2009 | Shen | H04L 1/0029 370/252 |
| 2010/0112957 | A1 | 5/2010 | Kong et al. | |
| 2010/0124291 | A1* | 5/2010 | Muharemovic | H04L 27/28 375/316 |
| 2010/0195817 | A1* | 8/2010 | Cendrillon | H04L 5/0048 379/406.06 |
| 2011/0080975 | A1 | 4/2011 | Toda et al. | |
| 2011/0170514 | A1* | 7/2011 | Eriksson | H04L 1/0026 370/329 |
| 2012/0002657 | A1 | 1/2012 | Seyama et al. | |
| 2012/0320862 | A1* | 12/2012 | Ko | H04B 7/063 370/329 |
| 2013/0094380 | A1* | 4/2013 | Taoka | H04L 25/0204 370/252 |
| 2013/0128846 | A1* | 5/2013 | Golitschek Edler von Elbwart | H04W 72/21 370/329 |
| 2014/0169198 | A1* | 6/2014 | Golitschek Edler von Elbwart | H04L 5/0057 370/252 |
| 2015/0372741 | A1* | 12/2015 | Kim | H04B 7/0641 370/329 |
| 2016/0323066 | A1 | 11/2016 | Duggan et al. | |

FOREIGN PATENT DOCUMENTS

| | | | | |
|---|---|---|---|---|
| CN | 101399644 | B * | 5/2012 | |
| CN | 102595469 | A * | 7/2012 | H04B 7/0417 |
| EP | 2663007 | A1 | 11/2013 | |
| WO | 2008021573 | A2 | 2/2008 | |
| WO | 2008051466 | A2 | 5/2008 | |

* cited by examiner

FEEDBACK INFORMATION PROCESSING METHOD, DEVICE AND SYSTEM

CROSS-REFERENCES TO RELATED APPLICATIONS

The present application is a continuation application of U.S. patent application Ser. No. 16/574,483, filed on Sep. 18, 2019, now U.S. Pat. No. 11,018,835, issued on May 25, 2021, which is a continuation application of U.S. patent application Ser. No. 15/306,763, filed on Dec. 05, 2016, now U.S. Pat. No. 10,498,515, issued on Dec. 3, 2019, which is a U.S. National Stage Application, filed under 35 U.S.C. 371, of International Patent Application No. PCT/CN2014/084120, filed on Aug. 11, 2014, which claims priority to Chinese patent application No. 201410182804.8 filed on Apr. 30, 2014, contents of all of which are incorporated herein by reference in their entireties.

TECHNICAL FIELD

The present disclosure relates to control technologies in the field of mobile communications, and in particular, to a method, apparatus and system for processing feedback information.

BACKGROUND

Long Term Evolution (LTE) projects are the evolution of 3G. LTE is not a 4G technology which is commonly misunderstood by people, and instead, it is a transition between 3G and 4G technologies. LTE is a 3.9G global standard, and uses OFDM and MIMO as an unique standard of its wireless network evolution, which improves and enhances the 3G air access technology. This technology with the OFDM/FDMA as a core technology can be treated as a "quasi-4G" technology. In a spectral bandwidth of 20 MHz, it can provide a peak rate of 100 Mbit/s in the downlink and a peak rate of 50 Mbit/s in the uplink, which improves the performance for users at a cell edge, enhances a cell capacity and reduces system latency.

The performance of the wireless system depends on a time-varying condition of a wireless link, which means that, for example, Block Error Ratio (BLER), throughput and delay are not constant. In order to deal with the changing condition of the wireless link and provide a reliable QOS, it is necessary to select an appropriate scheduling strategy. A processing mechanism of achieving dynamic adjustment is link adaptation. Generalized link adaptation includes inner loop link adaptation and outer loop link adaptation, HARQ and resource scheduling for matching channels etc.

The Inner Loop Link Adaption (ILLA) is mainly based on a Signal to Interference ratio (SINR). For this approach, a reasonable SINR threshold is set for each supported modulation and coding scheme, which requires consistency with the UE capability. Specifically, a terminal provides a CQI to a base station and the base station selects a MCS based on the CQI which is fed back.

The purpose of the Outer Loop Link Adaption (OLLA) is to maintain a packet loss rate to be above a fixed level by dynamic adaptive thresholds, except that differences between these thresholds remain the same. The base station may assign a specific offset value to a terminal, which can be used to adjust a predicted SINR value.

Since the transmission power in the LTE downlink is constant, the LTE employs different link adaptation technologies in order to accommodate rapid changes in the radio channel. Firstly, the Modulation and Coding Scheme (MCS) adapts to the channel quality at some frequency intervals based on feedback from a User Equipment (UE). Secondly, an evolved base station (eNodeB) has a capability of performing Frequency Domain Packet Scheduling (FDPS) to allocate the most suitable resources to the user. The purpose of Link Adaptation (LA) is to process the resulting feedback information from the terminal and then to select an appropriate MCS based on the information on a location of allocation in the frequency domain.

In Long Term Evolution (LTE) and Long Term Evolution Advanced (LTE-A) systems, the link adaptation adopts a method of combining inner loop link adaptation and outer loop adaptation. The ILLA is firstly responsible for selecting an appropriate MCS for the UE. This selection is based on a mapping relationship between a measured SINR and an allocated optimum MCS. The ILLA does not always adapt well to the channel (for example, rapid channel change) for a variety of reasons. Therefore, the function of the OLLA is also necessary. The purpose of the OLLA is to achieve a target BLER by adjusting the MCS selection. For example, the target BLER=0.1 in the LTE, and the base station can determine a current BLER by statistically analyzing HARQ ACKs fed back by the UE. Therefore, this method is based on Hybrid Automatic Repeat Request (HARQ)-ACK feedback information for first HARQ transmission.

In the LTE and LTE-A, the HARQ is a scheme of combining the ARQ and the FEC to retransmit only data packets with errors. The HARQ technology can well compensate for the influences of time variation and multipath fading of the wireless mobile channel on signal transmission, and has become one of indispensable key technologies in the system. The HARQ uses an incremental redundancy retransmission mechanism, and for each transmitted data packet, a complementary deletion manner is adopted. Various data packets can not only be decoded individually, but also can be combined into a coded packet with more redundant information and decoded as a whole. The system can support a plurality of HARQ processes simultaneously, and one HARQ process corresponds to one transport block. On the base station side, a CRC is firstly added to one transport block, which is then coded and modulated to form a stream of code words. One stream of code words is mapped to one or more layers, and is then mapped to a plurality of OFDMA sub-carriers, which are subsequently processed and are transmitted to a terminal through an air interface. On the terminal side, it is firstly judged whether the received stream of code words is first transmitted data or retransmitted data of the transport block. If it is first transmitted data, the stream of code words is directly decoded, if it is decoded correctly, ACK is generated, and if it is decoded wrongly, NACK is generated. Otherwise, data of the last code word and data of the currently received code word in an HARQ buffer are combined, and are then decoded. If it is decoded correctly, ACK is generated, and if it is decoded wrongly, NACK is generated. The generated ACK or NACK is referred to as HARQ-ACK acknowledgement information, and the terminal feeds back the acknowledgement information to the base station. On the base station side, if the acknowledgment information is ACK, it indicates that the transport block is transmitted successfully. If the acknowledgment information is NACK, it indicates that the transport block fails to be transmitted and a retransmission packet is required to be transmitted.

In the LTE and LTE-A, for control signaling required to be transmitted in the uplink, there are ACK/NACK and three forms which reflects downlink physical Channel State Information (CSI), which are Channels quality indication (CQI), a Pre-coding Matrix Indicator (PMI), and a Rank Indicator (RI).

The CQI plays a key role in the link adaptation process, and is a message transmitted by the UE to the eNodeB for describing a current downlink channel quality of the UE. The UE may measure a reference symbol transmitted by the base station, and then calculate the CQI.

The CQI is an index used to evaluate whether the downlink channel quality is good or bad. In the 36-213 protocol, the CQI is represented using an integer value within a range of 0 to 15, which represents different CQI levels respectively. Different CQIs correspond to respective MCSs, as shown in Table 1. The selection of the CQI level should follow the following criteria:

the selected CQI level should enable a block error rate of a PDSCH transport block corresponding to the CQI under a corresponding MCS not to exceed 0.1.

Based on a non-limited detection interval in the frequency domain and the time domain, the UE will obtain the highest CQI value, corresponding to each of the maximum CQI values transmitted in an uplink subframe n, the CQI serial numbers range from 1 to 15, and satisfy the following condition: an error rate BLER of a single PDSCH transport block is not more than 0.1 when the transport block is received, if CQI serial number 1 does not satisfy the condition, the CQI serial number is 0. The PDSCH transport block contains combined information, i.e. a modulation scheme and a transport block size, which corresponds to a CQI serial number and a set of occupied downlink physical resource blocks, i.e. CQI reference resources. Herein, the highest CQI value means a maximum CQI value which ensures that the BLER is not more than 0.1, this is beneficial for controlling the resource allocation. In general, the smaller the CQI value is, the more the resources are occupied, and the better the performance of the BLER is. Herein, the BLER is the error rate of the transport block, and the BLER is equal to the number of correctly transmitted TBs divided by the total number of transmitted TBs.

For the combined information having the transport block size and the modulation scheme which corresponds to a CQI sequence number, according to the related transport block size, the combined information for PDSCH transmission in the CQI reference resources can be notified using signaling, and additionally:

the modulation scheme is represented by the CQI serial number and uses the combined information including the transport block size and the modulation scheme in the reference resources, an effective channel coding rate generated by it is the most likely close effective channel coding rate which can be represented by the CQI serial number. When there is more than one piece of combined information and they can all generate equally close effective channel coding rates represented by the CQI serial number, combined information with the smallest transport block size is used.

Each CQI serial number corresponds to a modulation scheme and a transport block size. A correspondence relationship between transport block size and NPRB is shown in Table 1. A coding rate can be calculated according to the transport block size and a size of the NPRB.

TABLE 1

4-bit CQI table

| CQI index | modulation | cod rate x 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

There are many CQI definitions in the LTE, and the CQI can be divided according to different principles:

according to a measurement bandwidth, the CQI is divided into a wideband CQI and a subband CQI;

the wideband CQI refers to channel state indications of all the subbands, and CQI information of a subband set S is obtained;

the subband CQI refers to CQI information for each subband. In the LTE, according to different system bandwidths, RBs corresponding to an effective bandwidth are divided into a number of RB groups, and each RB group is referred to as a subband.

The subband CQI can also be divided into an all subband CQI and a Best M CQI. For the all subband CQI, CQI information of all subbands is transmitted; and for the Best M CQI, M subbands are selected from the subband set S and CQI information of the M subbands is transmitted while location information of the M subbands is transmitted.

According to the number of code streams, the CQI is divided into a single-stream CQI and a dual-stream CQI.

The single-stream CQI is applied in single-antenna transmitting port 0, port 5, transmit diversity, MU-MIMO, and closed-loop spatial multiplexing with RI=1, and at this time, the UE transmits CQI information of a single code stream.

The dual-stream CQI is applied in a closed-loop spatial multiplexing mode. For an open-loop spatial multiplexing mode, CQIs of two code streams are equal in the open-loop spatial multiplexing since channel state information is unknown and double-stream characteristics are equalized in the precoding.

According to a CQI representation method, the CQI is divided into an absolute value CQI and a differential CQI.

The absolute value CQI is a CQI index represented by 4 bits in Table 1; and the differential CQI is a CQI index represented by 2 bits or 3 bits. The differential CQI is further divided into a differential CQI of a second code stream with respect to a first code stream and a differential CQI of a subband CQI with respect to a subband CQI.

According to a CQI transmission scheme, the CQI is divided into a wideband CQI, a UE selected (subband CQI), and a high layer configured (subband CQI); the wideband CQI refers to CQI information of a subband set S; the UE selected (subband CQI) is a Best M CQI, CQI information of selected M subbands is fed back while positions of the M subbands are transmitted; and the high layer configured (subband CQI) is an all subband CQI, one piece of CQI information is fed back for each subband.

Both of the high layer configured and the UE selected are subband CQI feedback modes. In a non-periodic feedback mode, subband sizes defined by these two feedback modes are inconsistent. In the UE selected mode, a size of M is also defined.

In the LTE system, an ACK/NACK response message is transmitted on a Physical Uplink Control Channel (PUCCH) in a format 1/1a/1b (PUCCH format 1/1a/1b), and if a User Equipment (UE) needs to transmit uplink data, it is transmitted on a Physical Uplink Shared Channel (PUSCH). The feedback of the CQI/PMI and the RI may be periodic or non-periodic. A specific feedback is shown in Table 2.

Table 2: Uplink physical channels corresponding to periodic feedback and aperiodic feedback

| Scheduling mode | Periodic CQI reporting channel | Aperiodic CQI reporting channel |
|---|---|---|
| Frequency non-selective | PUCCH | |
| Frequency selective | PUCCH | PUSCH |

Herein, for the CQI/PMI and the RI which are fed back periodically, if the UE does not need to transmit the uplink data, the CQI/PMI and the RI which are fed back periodically are transmitted on the PUCCH in a format 2/2a/2b (PUCCH format 2/2a/2b), and if the UE needs to transmit the uplink data, the CQI/PMI and the RI are transmitted on the PUSCH. For the CQI/PMI and the RI which are fed back aperiodically, they are only transmitted on the PUSCH.

The Release 8 standard of the Long Term Evolution (LTE for short) defines three downlink physical control channels as follows: a Physical Control Format Indicator Channel (PCFICH for short), a Physical Hybrid Automatic Retransmission Request Indicator Channel (PHICH for short), and a Physical Downlink Control Channel (PDCCH for short). Herein, the PDCCH is used for carrying Downlink Control Information (DCI for short), including: uplink and downlink scheduling information, and uplink power control information. The DCI formats are divided into the following: DCI format 0, DCI format 1, DCI format 1A, DCI format 1B, DCI format 1C, DCI format 1D, DCI format 2, DCI format 2A, DCI format 3 and DCI format 3A etc., herein the transmission mode 5 supporting the MU-MIMO utilizes downlink control information of the DCI format 1D, and a downlink power offset field $\delta_{power\text{-}offset}$ in the DCI format 1D is used to indicate information of reducing power of a user by a half (i.e., −10 log 10(2)) in the MU-MIMO mode, since the MU-MIMO transmission mode 5 only supports MU-MIMO transmissions of two users. Through the downlink power offset field, the MU-MIMO transmission mode 5 can support dynamic switching between a SU-MIMO Mode and a MU-MIMO mode, but no matter whether in the SU-MIMO mode or the MU-MIMO mode, the DCI format only supports one stream transmission for one UE. Although the Release 8 of the LTE supports single-user transmission of at most two streams in the transmission mode 4, since switching between the transmission modes can only be semi-static, in the Release 8 of the LTE, dynamic switching between single-user multi-stream transmission and multi-user transmission cannot be achieved.

In the Release 9 of the LTE, in order to enhance downlink multi-antenna transmission, a transmission mode of dual-stream beamforming is introduced, which is defined as transmission mode 8, and DCI format 2B is added in the downlink control information to support such transmission mode. There is an identification bit of a Scrambling Identity (SCID for short) in the DCI format 2B to support two different scrambling sequences. The eNB can allocate the two scrambling sequences to different users, and multiplexing is performed for multiple users in the same resource. In addition, when only one transport block is enabled, a New Data Indication (NDI) bit corresponding to a disabled transport block is also used to indicate an antenna port during single-layer transmission.

As the mainstream standard of the fourth generation mobile communication, the Long Term Evolution Advanced (LTE-A) system is an evolved standard of the LTE, which supports a greater system bandwidth (up to 100 MHz) and is backward compatible with the existing standard of the LTE. In order to achieve higher average spectral efficiency of a cell and improve the coverage and throughput at a cell edge, on the basis of the existing LTE system, in the Rel-10 and Rel-11 releases, the LTE-A supports key technologies in the downlink such as SU/MU-MIMO dynamic switching of at most 8 antennas, Carrier Aggregation (CA), Coordinated Multi-point (COMP) transmission, Enhanced Inter-Cell Interference Coordination (eICIC), advanced Relay, enhanced PDCCH etc.

In addition, in Release 10 of the LTE, in order to further enhance multi-antenna transmission in the downlink, a new transmission mode of closed-loop spatial multiplexing is added, which is defined as transmission mode 9, and DCI format 2C is added in the downlink control information to support such transmission mode. This transmission mode can not only support single-user SU-MIMO, but also can support multi-user MU-MIMO, and can support dynamic switching therebetween. In addition, this transmission mode also supports 8-antenna transmission. This new transmission mode has determined to use a demodulation pilot (UE Specific Reference Signal (URS for short)) as a pilot for demodulation, and the UE can estimate a channel and interference on the pilot only by acquiring a location of the pilot.

Further, in Release 11 of the LTE, on the basis of the transmission mode 9, in order to further support the COMP transmission, transmission mode 10 is defined and DCI format 2D is added in the downlink control information to support this transmission mode.

In the R11 release, the UE is semi-statically configured through high-level signaling to receive PDSCH data transmission according to an indication of a PDCCH of a UE-specific search space based on one of the following transmission modes:

Transmission mode 1: Single antenna port; Port 0
Transmission mode 2: Transmit diversity
Transmission Mode 3: Open-loop spatial multiplexing
Transmission Mode 4: Closed-loop spatial multiplexing
Transmission Mode 5: Multi-user MIMO
Transmission mode 6: Closed-loop Rank=1 precoding
Transmission mode 7: single antenna port; port 5
Transmission mode 8: dual-stream transmission, that is, dual-stream beamforming
Transmission mode 9: up to 8 layer transmission
Transmission mode 10: Support up to 8 layer transmission of COMP The Machine Type Communication (MTC for short) User Equipment (user device or terminal for short), which is also known as Machine to Machine (M2M for short) user communication device, is a main application form of the current Internet of Things. In recent years, due to the high spectral efficiency of the Long-Term Evolution (LTE for short) or Long-Term Evolution Advanced (LTE-Advance or LTE-A for short), more and more mobile operators select the LTF/LTE-A as an evolution direction of broadband wireless communication systems. Based on the MTC of the LTE/LTE-A, various types of data services will also be more attractive.

In the MTC application terminal, there is a class of terminals having a significant reduction in coverage performance due to limitations of their locations or their own characteristics. For example, MTC terminals such as intelligent meter reading are mostly installed in low-coverage performance environments such as a basement, and they mainly transmit small-packet data, require a low data rate, and can tolerate a large data transmission delay. Since such terminals require a low data rate, for a Physical Downlink Share Channel (PDSCH for short), a Physical Uplink Share Channel (PUSCH for short), a Physical Downlink Control Channel (PDCCH for short), a Physical Uplink Control Channel (PDCCH for short) etc., the coverage performance can be improved by transmitting the same information repeatedly.

Simultaneous retransmissions may occupy a large number of resources, and numbers of retransmissions corresponding to different requirements for coverage improvement are also different. If the transmission is always carried out according to the same number of retransmissions, when a channel condition changes, there will be a condition that the resources are wasted repeatedly or a retransmission number is not enough. Therefore, it is necessary to develop a set of retransmission level adjustment mechanisms.

On the one hand, in the traditional mobile communication systems, in the case of fast channel change, traffic data burst, interference data burst, cell switching, use of advanced receivers etc., the traditional link adaptation technology is inaccurate and not fast. For example, the OLLA implements outer-loop link adaptation based on the number of ACKs or NACKs in the first packet transmission. This method is semi-static (requiring tens to hundreds of milliseconds) and cannot work effectively in the above scenario.

On the other hand, in the conventional mobile communication systems, after the data is decoded, a 1-bit ACK/NACK is generated, the channel adaptive condition caused by data decoding cannot be fully utilized, and the feedback is limited seriously.

SUMMARY

In order to solve the above technical problem, the embodiments of the present invention provide a method, apparatus and system for processing feedback information.

An embodiment of the present invention provides a method for processing feedback information, applied in a first transmission node, including:

the first transmission node receiving a signal of a data shared channel, and determining data transmission level indication information of a transport block according to the signal; where the data transmission level indication information is used to indicate a data transmission level; and the first transmission node transmitting the data transmission level indication information corresponding to the transport block to a second transmission node.

The present invention further provides a method for processing feedback information, applied in a second transmission node, including:

the second transmission node receiving data transmission level indication information of a transport block transmitted by a first transmission node; and the second transmission node determining a Modulation and Coding Scheme (MCS) or a number K of retransmissions of data information according to the data transmission level indication information, The data transmission level indication information is used to indicate data transmission level information, where the data transmission level indication information is acquired according to a data shared channel, and K is an integer greater than or equal to 1.

An embodiment of the present invention provides a transmission node, including:

a receiving module configured to receive a signal of a data shared channel;

a determination module configured to determine data transmission level indication information of a transport block according to the signal; and a transmission module configured to transmit the data transmission level indication information corresponding to the transport block to a second transmission node.

An embodiment of the present invention further provides a transmission node, including:

a receiving module configured to receive data transmission level indication information of a transport block transmitted by a first transmission node: and a determination module configured to determine a Modulation and Coding Scheme (MCS) or a number K of retransmissions of data information according to the data transmission level indication information, where K is greater than or equal to 1.

An embodiment of the present invention provides a system for processing feedback information, including:

a first transmission node configured to receive a signal of a data shared channel, determine data transmission level indication information of a transport block according to the signal, and transmit the data transmission level indication information corresponding to the transport block to a second transmission node; and the second transmission node configured to receive the data transmission level indication information of the transport block transmitted by the first transmission node, and determine a Modulation and Coding Scheme (MCS) of data information or a number K of retransmissions according to the data transmission level indication information.

The method, apparatus and system for processing feedback information according to the embodiments of the invention enable the second transmission node to adjust the link adaptation according to the data transmission level information transmitted by the first transmission node, which can improve the effect of the link adaptation of the system on the basis of increasing feedback signaling, and finally enhances the system capacity and spectral efficiency of the mobile communication system.

DETAILED DESCRIPTION

The present invention will be further described in detail below in conjunction with accompanying drawings and specific embodiments.

Method Embodiment One

Figure 1:
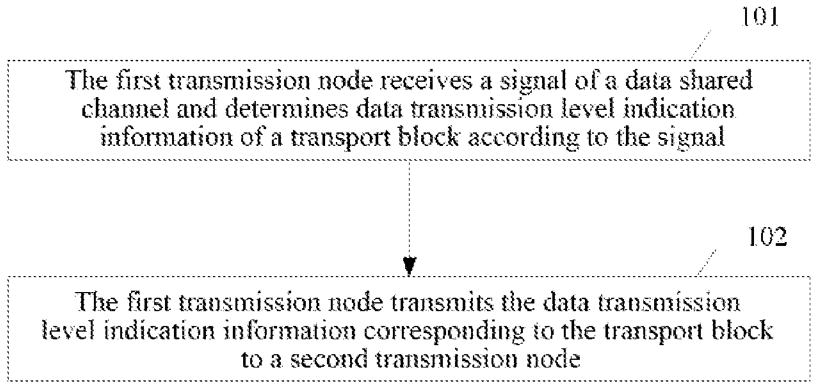
FIG. 1 is flowchart one of a method for processing feedback information according to an embodiment of the present invention.

On the basis of being compatible with the existing ACK/NACK feedback, the present embodiment provides a method for processing feedback information applied in a first transmission node, as shown in FIG. 1, including the following steps.

In step 101, the first transmission node receives a signal of a data shared channel and determines data transmission level indication information of a transport block according to the signal;

in step 102, the first transmission node transmits the data transmission level indication information corresponding to the transport block to a second transmission node, wherein the data transmission level indication information indicates data transmission level information.

Here, the first transmission node is a terminal and the second transmission node is a base station; or the first transmission node is a base station and the second transmission node is a terminal.

The data transmission level indication information includes one of the following: triggered error level indication information, triggered channel quality indication information, triggered power parameter level indication information, triggered repetition level indication information, triggered blind-detectable Acknowledgement (ACK) information, soft ACK/Negative Acknowledgement (NACK) information, indication information of joint coding of triggered channel quality indication information or triggered power parameter level or triggered repetition number level and an ACK positive acknowledgement information, or indication information of joint coding of a triggered channel quality indication level information or triggered power parameter level or triggered repetition number level and a Hybrid Automatic Repeat Request (HARQ) acknowledgment information.

It should be pointed out that the joint coding method proposed in the present invention can effectively reduce the feedback overhead compared to the non-joint coding scheme.

Herein, the soft ACK/NACK information is indication information of joint coding of the error level indication information and the ACK, and the blind-detectable ACK refers to that the second transmission node can detect a predefined resource, and if the first transmission node transmits the ACK information, the resource can at least carry the ACK information, the second transmission node can detect the ACK information on the resource, and if the first transmission node does not transmit the ACK information, the resource can be used to carry other control information or data; and for the shared channel, the first transmission node can only transmit the ACK acknowledgment information and cannot transmit the NACK acknowledgment information.

The HARQ acknowledgement information is ACK information or NACK information.

Herein, acquiring the ACK information or NACK information may be the UE generating positive acknowledgement (ACK) information when the data of the transport block is decoded successfully or the UE generating negative ACKnowledgement (NACK) information when the data of the transport block is decoded wrongly.

When data of the transport block is decoded wrongly, the error level indication information is used to indicate level information of an error degree and/or error pattern, wherein the level information includes at least one of the following: bit error rate level information, code block error rate level information, packet error rate level information, code block set error pattern level information, code block error number level information, and packet error number level information.

Alternatively, the error levels may be divided into N levels, herein N is a positive integer greater than or equal to 2, and different error levels indicate different error rate ranges.

Herein, the error rate range is defined by an error rate threshold, and different error rate thresholds are fixed or are semi-statically configured by a base station. For example, when N=2, the error level indication information may include two levels, i.e., high and low; and when N=3, the error level indication information may include three levels, i.e., high, medium, and low. N has a value of $2^k$ or $2^k-1$, and k is a positive integer greater than 1.

The code block set error pattern level information includes the error level indication information which indicates N levels, and different error levels indicate different code block set error pattern levels; and the transport block is divided into M code blocks which are divided into NO sets; and the code block set error pattern level indication information is used to indicate whether each code block set is decoded wrongly or indicate the number of erroneous code block sets; herein when at least one code block in the code block set is erroneous, the code block set is an erroneous code block set.

The triggered error level indication information, the channel quality indication information, the power parameter level indication information, or the repetition number level indication information is level indication information triggered by the data shared channel or HARQ acknowledgment information or downlink grant information.

The manner of triggering the data transmission level indication information includes that the triggered error level indication information, the channel quality indication information, the power parameter level indication information, or the repetition number level indication information is level information triggered by the data shared channel or HARQ acknowledgment information or downlink grant information.

The triggered channel quality indication information is used to, on condition of true transmission of the data shared channel and in a case of all the conditions being unchanged except allowing a transport block size and a modulation and coding scheme changeable, determine a channel quality level which is adjusted corresponding to an adjusted modulation and coding level required to receive a transport block at a target error rate P on a corresponding resource of the data shared channel, herein P is a real number between 0 and 1.

The triggered power parameter level indication information is used to on condition of true transmission of the data shared channel and in a case of all the conditions being unchanged except allowing power changeable, determine a power of the data shared channel required to be adjusted to receive the transport block at a target error rate P on a corresponding resource of the data shared channel, herein P is a real number between 0 and 1.

The triggered repetition number level indication information is used to on condition of true transmission of the data shared channel and in a case of all the conditions being unchanged except allowing a retransmission number changeable, determine the adjusted number of retransmissions required to receive the transport block at a target error rate P on a corresponding resource of the data shared channel, herein P is a real number between 0 and 1.

Alternatively, different channel quality indication information indicates different adjusted channel quality indication levels ΔCQI levels or channel quality indication levels, which are acquired according to a channel measurement or a channel measurement and an interference measurement of the data shared channel or a user-specific pilot corresponding to the shared channel; wherein a step for adjusting the CQI is a fixed step or is semi-statically configured by a base station.

The method for determining a CQI adjustment level may be as follows. When the channel quality indication level=2, the CQI adjustment level includes ΔCQI1 and −ΔCQI2, herein ΔCQI1 and ΔCQI2 are positive integers; and when the channel quality indication level=3, the error CQI level includes ΔCQI1, −ΔCQI2 and −ΔCQI3, herein ΔCQI1, ΔCQI2 and ΔCQI3 are positive integers. Herein, the channel quality indication level may have a value of $2^k$ or $2^k-1$, where k is a positive integer greater than 1.

Alternatively, the method for determining an error level in the data transmission level indication information may include: determining the error level according to a Block Code Error Rate (BCER) of data of the decoded transport block; determining the error level according to a Bit Error Rate (BER) of data of the decoded transport block; or determining the error level according to a Packet Error Rate (PER) or a Frame Error Rate (FER) of data of the decoded transport block, herein a size of a packet may not be equal to a size of a code block.

Herein, the BCER is an error rate of a code block, and for an HARQ transmission of one transport block, the BCER is equal to the number of code blocks which are transmitted wrongly divided by the number of all the code blocks for the transport block.

More specifically, the method for calculating the BCER may include decoding the M code blocks of the received transport block respectively to successfully acquire L code blocks, wherein the BCER of the transport block is equal to L/M, the transport block includes M code blocks, L is a positive integer equal to or greater than 0, and M is a positive integer equal to or greater than 1. It should be pointed out that the larger a value of M, the better.

More specifically, N−1 BCER thresholds are defined in an order from small to large or from large to small, an interval of the BCER from 0 to 1 is divided into N sub-regions, and if a predicted BCER is in a $k^{th}$ region, a level of the BCER is k, where k is a positive integer within a range from 0 to N−1.

The BER is a bit error rate of a transport block, and for a HARQ transmission of a transport block, the BER is equal to the estimated number of bits which are wrongly transmitted divided by the total number of transmitted bits.

Herein, acquiring the BER may include the following methods. In method one, the M code blocks of the received transport block respectively are decoded, numbers of erroneous bits of all the code blocks are accumulated, and a result of the accumulation is divided by a transport block size to acquire an estimated BER. Specifically, a transport block is consisted of one or more code blocks, and each code block has a code block CRC. If turbo coding is used for each code block, on the terminal side, for each code block, when the code block is decoded completely using a turbo code, a decoding result of hard decision is output.

The code block CRC is detected. If the CRC detection does not pass, it indicates that the code block is decoded wrongly, and an interleaved hard decision output of a first component decoder is compared with a hard decision output of a second component decoder to acquire the number of bits for which the interleaved hard decision output of the first component decoder is different from the hard decision output of a second component decoder, which is the number of erroneous bits of the code block. If the CRC detection passes, it indicates that the code block is decoded successfully and the number of erroneous bits of the code block is 0. In a similar way, numbers of erroneous bits of all code blocks can be acquired, and then are accumulated. Then, a result of the accumulation is divided by a transport block size to acquire the estimated BER.

In method two, the M code blocks of the received transport block are decoded respectively to acquire a log likelihood ratio of information bits of each code block.

Specifically, an absolute value of the log likelihood ratio of all the information bits of the code block is compared with a preset threshold, and the number of bits having a log likelihood ratio larger than the threshold is used as the number of erroneous bits of the code block, the numbers of erroneous bits of all the code blocks are accumulated, and then a result of the accumulation is divided by a transport block size to acquire the BER.

Specifically, a transport block is consisted of one or more code blocks and each code block has a code block CRC. If turbo coding is used for each code block, on the terminal side, for each code block, when the code block is decoded completely using a turbo code, not only a decoded result of hard decision is output, but also a final output of soft decision is needed to be acquired, i.e., a log likelihood ratio of information bits. Then, a log likelihood bit threshold is determined, and absolute values of log likelihood ratios of all information bits of the code block are compared with the threshold. The number of bits having a log likelihood ratio larger than the threshold is the number of erroneous bits of the code block. In a similar way, numbers of erroneous bits of all code blocks can be acquired, and then are accumulated. Then, a result of the accumulation is divided by a transport block size to acquire the estimated BER.

In method three, the received M code blocks of the transport block are decoded respectively, to acquire extrinsic information of information bits of each code block. Absolute values of log likelihood ratios of all information bits of the code block are compared with a preset threshold. The number of bits having a log likelihood ratio larger than the threshold is the number of erroneous bits of the code block. Numbers of erroneous bits of all code blocks are accumulated. Then, a result of the accumulation is divided by a transport block size to acquire the BER.

Specifically, it is assumed that a transport block is divided into one or more code blocks and each code block has a code block CRC. If turbo coding is used for each code block, on the terminal side, for each code block, when the code block is decoded completely using a turbo code, not only a decoded result of hard decision is output, but also final extrinsic information is output. Then, a threshold of the extrinsic information is determined, and absolute values of the extrinsic information of all the information bits of the code block are compared with the threshold. The number of bits having extrinsic information larger than the threshold is the number of erroneous bits of the code block. In a similar way, numbers of erroneous bits of all the code blocks can be acquired and then accumulated. Then, a result of the accumulation is divided by a transport block size to acquire the estimated BER.

More specifically, N−1 BER thresholds are defined in an order from small to large or from large to small, an interval of the BER from 0 to 1 is divided into N sub-regions, and if a predicted BER is in a $k^{th}$ region, a level of the BER is k, where k is a positive integer within a range from 0 to N−1.

Further, the error level corresponding to each transport block is acquired according to the PER or FER of decoded data of the transport block, herein each packet or frame has a CRC and has a length smaller than that of a code block.

Calculating the channel quality indication information or power parameter level indication information or repetition level indication information includes:

decoding the received transport block respectively to acquire error level indication information or mutual entropy information of each bit of the transport block; and calculating the channel quality indication level information or power parameter level information or repetition level information according to the error level indication information or the mutual information of each bit.

The indication information of joint coding of the error level indication information and the ACK includes joint-coding indication information for indicating an error level and an ACK corresponding to each transport block, which is indicated using X bits, herein 1 state indicates the ACK, and the remaining $2^X-1$ states indicate different error levels.

The error level indication information corresponding to each transport block is a level indicating an error degree when data of the transport block is decoded wrongly.

Alternatively, in the above step 102, the first transmission node such as a terminal transmitting data transmission level indication information corresponding to the transport block to the second transmission node such as a base station may include:

the first transmission node transmitting the data transmission level indication information to the second transmission node through the data shared channel or a control channel.

For example, the UE transmits the data transmission level indication information to the base station through a Physical Uplink Shared Channel (PUSCH) or a Physical Uplink Control Channel (PUCCH).

This further includes the following three conditions.

In a first condition, the first transmission node transmits the triggered error level indication information, the triggered channel quality indication information, the triggered power parameter level indication information, or the triggered repetition number level indication information together with the HARQ acknowledgment information to the second transmission node through the data shared channel.

For example, the UE transmits the error level indication information and the HARQ acknowledgment information or the triggered channel quality indication information and the HARQ acknowledgment information to the base station through the PUSCH.

In a second condition, the first transmission node transmits the indication information of joint coding of the triggered error level indication information, the triggered channel quality indication information, the triggered power parameter level indication information, or the triggered repetition number level indication information and the ACK or HARQ acknowledgment information to the second transmission node through the control channel.

For example, the UE transmits the indication information of joint coding of the error level indication information and the ACK to the base station through the PUCCH.

In a third condition, the first transmission node transmits the triggered blind-detectable ACK information to the second transmission node through the data shared channel or the control channel.

The HARQ acknowledgment information triggers the data transmission level indication information.

Herein, the first transmission node transmitting the data transmission level indication information to the second transmission node through the data shared channel or the control channel includes: if the terminal transmits the HARQ acknowledgement information through a control channel such as PUCCH on an $n^{th}$ subframe, transmitting the triggered error level indication information, the triggered channel quality indication information, the triggered power parameter level indication information, or the triggered repetition number level indication information through another control channel or data shared channel such as PUCCH or PUSCH on an $(n+k)^{th}$ subframe, where n is any positive integer and k is a fixed value or a value in a set of not more than 10 fixed values.

Further, only when the HARQ acknowledgment information is ACK, the error level indication information or the triggered channel quality indication information is transmitted, and otherwise, it is not transmitted.

The data shared channel triggers the data transmission level indication information. The first transmission node transmitting the data transmission level indication information to the second transmission node through the data shared channel or the control channel includes: if the terminal transmits the data shared channel on an $n^{th}$ subframe, transmitting the triggered error level indication information, the triggered channel quality indication information, the triggered power parameter level indication information, or the triggered repetition number level indication information through another control channel or data shared channel such as PUCCH or PUSCH on an $(n+k)^{th}$ subframe, where n is any positive integer and k is a fixed value or a value in a set of not more than 10 fixed values.

Further, an grant control information format for the shared data channel includes a request indication field. If the indication field is 1, the feedback of the level indication information together with the HARQ acknowledgment information is triggered, and if the indication field is reserved or is 0, the feedback information is not triggered. Herein, the level indication information includes at least one of the following: error level indication information, channel quality indication information, power parameter level indication information, or repetition number level indication information.

For example, the first transmission node is a terminal UE, and downlink grant (a downlink control information format of DCI format NY) corresponding to the PDSCH for transmitting the transport block includes a request indication field (CQI request), and if the indication field is 1, the feedback of the data transmission level indication information is triggered, and if the indication field is reserved or is 0, the feedback information is not triggered. Where, N is 1 or 2 and Y is A or B or C or D.

The grant control information format triggers the data transmission level indication information.

The first transmission node transmitting the data transmission level indication information to the second transmission node through the data shared channel or the control channel includes: if the terminal transmits an grant control information format through the control channel on an nth subframe, transmitting trigged channel quality indication information of one or two transport blocks of the data shared channel corresponding to the downlink grant through the PUCCH or the PUSCH on an (n+k)th subframe, where n is any positive integer and k is a fixed value or a value in a set of not more than 10 fixed values.

For example, if the terminal transmits one downlink grant on an nth subframe, the triggered channel quality indication information of one or two transport blocks of the data shared channel corresponding to the downlink grant is transmitted through the PUCCH or PUSCH on the (n+k)th subframe.

Further, the grant control information format includes a request indication field. If the indication field is 1, the feedback of the error level indication information, the channel quality indication information, the power parameter level indication information, or the repetition number level indication information together with the HARQ acknowledgment information is triggered, and if the indication field is reserved or is 0, the feedback information is not triggered.

For example, the first transmission node is a terminal, and downlink grant (a downlink control information format of DCI format NY) transmitted on an nth subframe includes a request indication field (CQI request), and if the indication field is 1, the feedback of the data transmission level indication information is triggered, and if the indication field is reserved or is 0, the feedback information is not triggered. Where, N is 1 or 2 and Y is A or B or C or D.

HARQ acknowledgment information and non-joint coded data transmission level indication information are transmitted at the same time.

The first transmission node transmitting the data transmission level indication information to the second transmission node through the data shared channel or the control channel includes: the terminal transmitting the HARQ acknowledgment information and one of the following information at the same time on the $n^{th}$ subframe: the error level indication information, the channel quality indication information, the power parameter level indication information, and repetition number level indication information.

Further, the first transmission node such as the UE only transmits the data transmission level indication information such as the error level indication information and HARQ acknowledgment information or the triggered channel quality indication information and the HARQ acknowledgment information for the retransmission to the second transmission node, or the first transmission node such as the UE transmits the data transmission level indication information for each transmission such as the error level indication information and the HARQ acknowledgment information to the second transmission node such as the base station.

Alternatively, the above solution may further include: the first transmission node such as the UE transmitting CQI information to a second transmission node such as a base station.

With the above solution, it is possible for the second transmission node to quickly achieve link adaptation according to the data transmission level indication information transmitted by the first transmission node. If the data transmission level indication information includes the triggered error level indication information or the triggered channel quality indication information or the power parameter level indication information, the problem of the inaccuracy of the OLLA can be well solved; if the data transmission level indication information includes the code block set error pattern indication information or the packet error rate error level indication information, it can improve the efficiency and the performance of the link adaptation technology HARQ; and if the data transmission level indication information includes the repetition level indication information or the blind-detectable ACK information, under an MTC scenario, a retransmission number can be dynamically controlled, and there is no need to reserve a feedback channel for each subframe, which realizes the control of the repetition number at a subframe level, and realizes rateless transmission, thus significantly improving the efficiency of the link adaptation under the MTC scenario, and thereby enhancing the system capacity and performance. In summary, the present invention improves the effect of the link adaptation of the system well on the basis of increasing a small amount of uplink feedback signaling, can more accurately estimate the channel quality and data transmission conditions, and finally improve the system capacity and spectral efficiency of the mobile communication system.

Example 1

Figure 2:
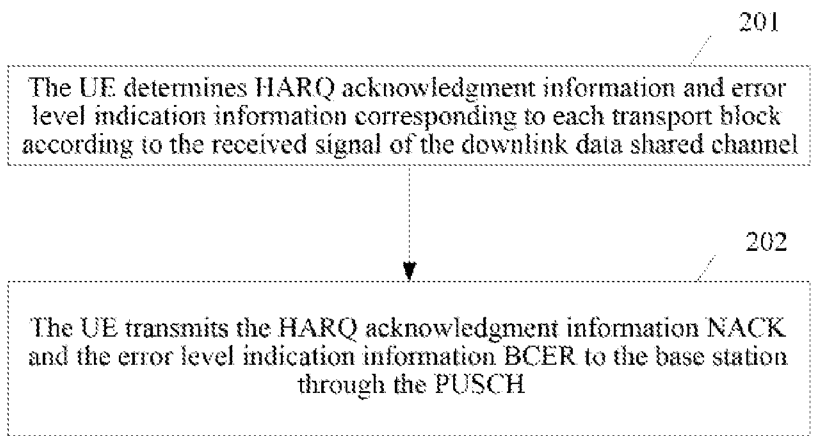
FIG. 2 is flowchart two of a method for processing feedback information according to an embodiment of the present invention.

The above embodiment will be described below by taking the error level indication information in the data transmission level indication information being a BCER corresponding to the transport block, the first transmission node being a UE and the second transmission node being a base station as an example. As shown in FIG. 2, the embodiment includes the following steps.

In step 201, the UE determines HARQ acknowledgment information and error level indication information corresponding to each transport block according to the received signal of the downlink data shared channel.

Herein, the HARQ acknowledgment information is NACK, which indicates that the data is decoded wrongly. The error level indication information indicates a level of an error degree when the data is decoded wrongly, which is divided into N levels, where N is a positive integer larger than or equal to 2. If N=2, it is divided into two levels, i.e., a high error level and a low error level.

The error level is represented by the BCER of the transport block. That is, the transport block is divided into M code blocks, and various code blocks are coded and decoded respectively. If L blocks are decoded successfully, the BCER of the transport block is equal to L/M. A BCER interval is divided into N=2 segments from 0 to 1, and a threshold is ½. If the BCER value is greater than ½, the error level is 2, that is, the high error level, or if the BCER value is less than ½, the error level is 1, i.e., the low error level.

In step 202, the UE transmits the HARQ acknowledgment information NACK and the error level indication information BCER to the base station through the PUSCH.

Herein, if terminal transmits the HARQ acknowledgment information on an $n^{th}$ subframe, the error level indication information is transmitted on an $(n+k)^{th}$ subframe, where k is a fixed value or a value in a set of not more than 10 fixed values. Here, if k takes a fixed value of 5, the terminal transmits the HARQ acknowledgment information on the $n^{th}$ subframe, and transmits the error level indication information on an $n+5^{th}$ subframe.

With the above solution, it is possible for the second transmission node to quickly achieve link adaptation according to the data transmission level indication information transmitted by the first transmission node. If the data transmission level indication information includes the triggered error level indication information, the problem of the inaccuracy of the CQI, for example, the inaccuracy of the OLLA, can be solved. Further, it can also be used for partial transmission of HARQ transmission blocks to improve the efficiency of the HARQ.

Example 2

Figure 3:
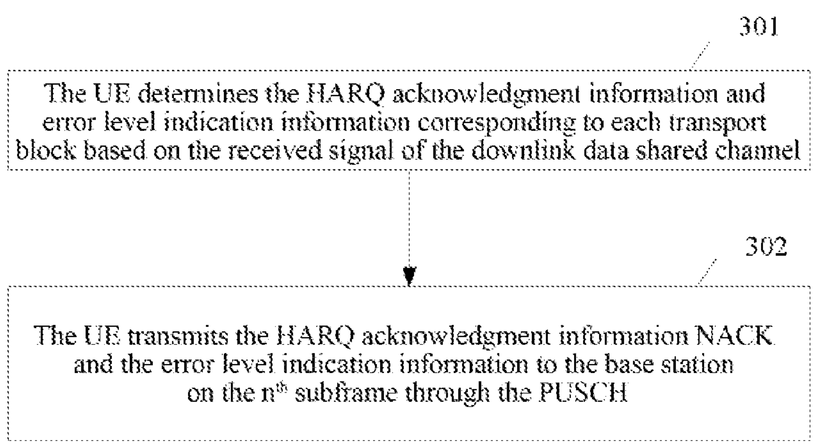
FIG. 3 is flowchart three of a method for processing feedback information according to an embodiment of the present invention.

The above embodiment will be described below by taking the error level in the data transmission level indication information being a BER corresponding to the transport block, the first transmission node being a UE, and the second transmission node being a base station as an example. As shown in FIG. 3, the embodiment includes the following steps.

In step 301, the UE determines the HARQ acknowledgment information and error level indication information corresponding to each transport block based on the received signal of the downlink data shared channel.

Herein, the HARQ acknowledgment information is NACK, which indicates that the data is decoded wrongly. The error level indication information indicates a level of an error degree when the data is decoded wrongly, which is divided into N levels, where N is a positive integer greater than or equal to 2. If N=3, it is divided into three levels, i.e., a high error level, a medium error level and a low error level.

The error level is represented by the BER of the transport block. The transport block is divided into several code blocks, and each code block has a CRC, and is coded using a Turbo code. In this case, numbers of erroneous bits of various code blocks can be accumulated to acquire the total number of erroneous bits. The number is divided by a transport block size to acquire an estimated BER.

There are three manners to acquire the numbers of erroneous bits of various code blocks.

In a first manner, after each code block is decoded completely on the terminal side, a decoded result $K_1$ of hard decision is output and CRC checking is implemented. If the CRC detection does not pass, it indicates that the code block is decoded wrongly, and then an interleaved hard decision output $K_2$ of a first component decoder is compared with a hard decision output $K_3$ of a second component decoder. The number of bits for which $K_2$ and $K_3$ are different is the number of the erroneous bits of the code block.

In a second manner, when each code block is decoded completely on the terminal side, not only a decoded result of hard decision is output, but also a final output of soft decision is needed to be acquired, i.e., a log likelihood ratio of information bits. Then, a log likelihood bit threshold is determined, and absolute values of log likelihood ratios of all information bits of the code block are compared with the threshold. The number of bits having a log likelihood ratio larger than the threshold is the number of erroneous bits of the code block.

In a third manner, when the code block is decoded completely on the terminal side, not only a decoded result of hard decision is output, but also an output of final extrinsic information is needed to be acquired. Then, a threshold of the extrinsic information is determined, and absolute values of the extrinsic information of all the information bits of the code block are compared with the threshold. The number of bits having extrinsic information larger than the threshold is the number of erroneous bits of the code block.

If the BER of the transport block is equal to p, a BER interval is divided into N=3 segments from 0 to 1 with thresholds of ⅓ and ⅔. If a BER value is greater than or equal to ⅔, an error level is 3, that is, the high error level, or if the BER value is greater than or equal to ⅓ and less than ⅔, i.e., ⅓≤BER<⅔, the error level is 2, that is, the medium error level, or if the BER value is less than ⅓, the error level is 1.

In step 302, the UE transmits the HARQ acknowledgment information NACK and the error level indication information 2 to the base station on the $n^{th}$ subframe through the PUSCH.

With the above solution, it is possible for the second transmission node to quickly achieve link adaptation according to the data transmission level indication information transmitted by the first transmission node. If the data transmission level indication information includes the triggered error level indication information, the problem of the inaccuracy of the CQI, for example, the inaccuracy of the OLLA, can be solved well.

Example 3

Figure 4:
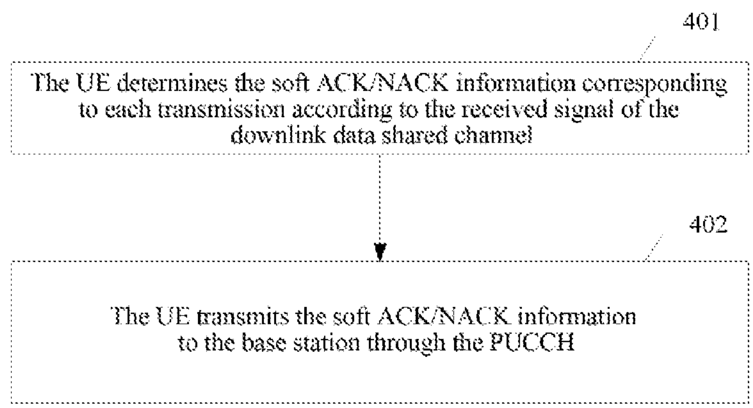
FIG. 4 is flowchart 4 of a method for processing feedback information according to an embodiment of the present invention.

The above embodiment will be described below by taking the error level being determined by a FER the first transmission node being a UE, and the second transmission node being a base station as an example. As shown in FIG. 4, the embodiment includes the following steps.

In step 401, the UE determines the soft ACK/NACK information corresponding to each transmission based on the received signal of the downlink data shared channel.

Herein, the joint-coding indication information is indicated by X bits, a state such as all-zero state represents correct decoding ACK, and the remaining $2^X-1$ states represent different error level indication information. The error level indication information indicates a level of an error degree during erroneous decoding. If X=2, there are error levels 1, 2 and 3, that is, the error level is divided into N levels and N=3. In other words, the error level is divided into three levels, i.e., a high error level, a medium error level and a low error level.

The error level is represented by a PER or FER of the transport block, where a size of a packet is smaller than a size of a code block. The transport block is divided into several code blocks, each code block is further divided into one or more packets, and each packet has a CRC. If the transport block is divided into M small packets, and after each small packet is decoded, when the CRC detection is correct, then it is called correct decoding. If L small packets are decoded successfully, then the PER of the transport block is equal to L/M. The PER is divided into three levels. If the PER level is low, the soft ACK/NACK information is [01], if the PER level is medium, the soft ACK/NACK information is [10], if the PER level is high, the soft ACK/NACK information is [11], and if the decoding is correct, the soft ACK/NACK information is [00].

In step 402, the UE transmits the soft ACK/NACK information to the base station through the PUCCH.

With the above solution, it is possible for the second transmission node to quickly achieve link adaptation according to the data transmission level indication information transmitted by the first transmission node. If the data transmission level indication information includes the triggered error level indication information, the problem of the inaccuracy of the CQI, for example, the inaccuracy of the OLLA, can be solved well.

Example 4

Figure 5:
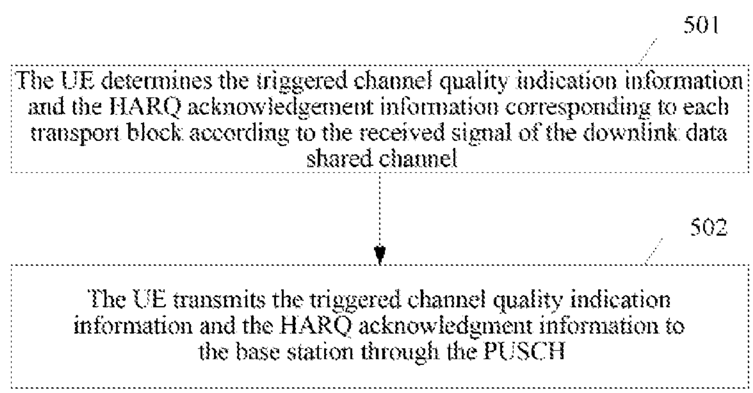
FIG. 5 is flowchart five of a method for processing feedback information according to an embodiment of the present invention.

The above embodiment will be described below by taking the triggered channel quality indication information, the first transmission node being a UE, and the second transmission node being a base station as an example. As shown in FIG. 5, the embodiment includes the following steps.

In step 501, the UE determines the triggered channel quality indication information and the HARQ acknowledgement information corresponding to each transport block according to the received signal of the downlink data shared channel.

Herein the triggered channel quality indication information CQI indicates N channel quality levels, and N is a positive integer greater than or equal to 2. For example, when N=2, the triggered CQI level includes ΔCQI1 and −ΔCQI2, where ΔCQI1 and ΔCQI2 are positive numbers. If the conventional CQI level is 7, there are two differential CQI levels, which are ΔCQI1=1 and −ΔCQI2=−2. When the error CQI level is 1, the adjusted CQI level is 8, and when the error CQI level is −2, the adjusted CQI level is 5.

The method of acquiring the triggered channel quality indication information includes the following manners.

In a first manner, the error level indication information is firstly acquired, and then the triggered channel quality indication information is acquired according to the error level indication information. Specifically, the received transport block is decoded and error rate information of the transport block is obtained. According to the error rate information, the channel quality indication information is calculated in accordance with some mapping rule (a correspondence relation between an error rate range and ΔCQI).

For example, if the triggered channel quality indication information indicates N=4 levels, a correspondence relationship table between an estimated BER range and a CQI can be predefined. For example, when BER=0~0.001, ΔCQI=0, which represents that the CQI is not adjusted; when BER=0.01~0.001, ΔCQI=−1, which represents that the CQI is adjusted down by one level; when BER=0.1~0.01, ΔCQI=−2, which represents that the CQI is adjusted down by two levels; and when BER=0.1~0.01, ΔCQI=−4, which represents that the CQI is adjusted down by four levels. Thus, according to the method proposed in the previous embodiment, the estimated BER can be acquired, and then the differential CQI, i.e., the triggered channel quality indication level information, can be acquired according to the estimated BER and the correspondence relationship table.

In a second manner, a modulation and coding level required to be adjusted is firstly acquired, and a CQI required to be adjusted is acquired according to a correspondence relationship between a modulation and coding index table and a CQI table, so as to acquire the triggered channel quality indication level information. It should be noted that the modulation and coding index table is a table used by the base station to select a modulation and coding scheme, and the CQI table is a table which is used by the terminal to reflect the channel transmission quality. The two tables are totally different.

Another form includes: firstly acquiring a modulation and coding level required to be adjusted, then acquiring an SNR required to be adjusted according to a correspondence relationship between a modulation and coding index table and SNRs, and then acquiring a CQI required to be adjusted according to a relationship between a CQI and an SNR, so as to acquire the triggered channel quality indication information.

The method of acquiring the modulation and coding level required to be adjusted includes:

on condition of true transmission of the data shared channel PDSCH (in a case of all conditions being unchanged except allowing a TBS and a modulation and coding scheme changeable), determining a modulation and coding level required to be adjusted to receive a transport block at a target error rate P on a corresponding resource of the data shared channel PDSCH, herein basic modulation and coding is the modulation and coding used for true transmission on the PDSCH, and P is a real number between 0 and 1. The method primarily achieves the target error rate P, for example, BLER=0.1, in a rate matching manner.

In a third manner, an SNR required to be adjusted is firstly acquired, and then a CQI required to be adjusted is acquired according to a correspondence relationship between a CQI table and SNRs, so as to acquire the triggered channel quality indication level information.

The methods for acquiring the SNR required to be adjusted includes:

on condition of true transmission of the data shared channel PDSCH (in a case of allowing all the conditions including a TBS being unchanged except allowing a modulation and coding scheme changeable), determining an SNR required to be adjusted to receive a transport block at a target error rate P on a corresponding resource of the data shared channel PDSCH, herein basic modulation and coding manner is the SNR used for true transmission on the PDSCH, and where P is a real number between 0 and 1. The method primarily achieves the target error rate P, for example, BLER=0.1, in a power matching manner.

In step 502, the UE transmits the triggered channel quality indication information and the HARQ acknowledgment information to the base station through the PUSCH.

Herein, the terminal transmits the HARQ acknowledgment information on an $n^{th}$ subframe, and transmits the triggered channel quality indication information on an (n+k)$^{th}$ subframe, where k is a fixed value or a value in a set of not more than 10 fixed values. k is a value in a set of 10 fixed values, which is {10, 9, 8, 7, 6, 5, 4, 3, 2, 1}. Here, if k is 3, the terminal transmits the HARQ acknowledgment information on the n$^{th}$ subframe, and transmits the triggered channel quality indication information on the (n+3)$^{th}$ subframe.

With the above solution, it is possible for the second transmission node to quickly achieve link adaptation according to the channel quality indication information transmitted by the first transmission node. If the data transmission level indication information includes the triggered channel quality indication information, the problem of the inaccuracy of the CQI, for example, the inaccuracy of the OLLA, can be solved well.

Example 5

Figure 6:
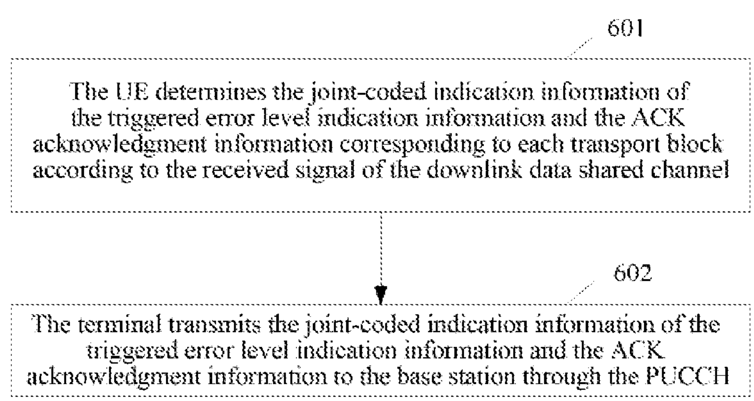
FIG. 6 is flowchart six of a method for processing feedback information according to an embodiment of the present invention.

The above embodiment will be described below by taking the error level indication information being the data transmission level indication information, the error level indication information being the code block set error pattern level information, the first transmission node being a UE, and the second transmission node being a base station eNodeB as an example. As shown in FIG. 6, the embodiment includes the following steps.

In step 601, the UE determines the indication information of joint coding of the triggered error level indication information and the ACK acknowledgment information corresponding to each transport block according to the received signal of the downlink data shared channel.

Herein, the error level indication information indicates N levels, and different error levels indicate different code block set error patterns; and the transport block is divided into M code blocks which are divided into N0 sets; and the code block set error pattern level indication information is used to indicate whether each code block set is decoded wrongly or indicate the number of erroneous code block sets; herein when at least one code block in the code block set is erroneous, the code block set is an erroneous code block set.

Firstly, for example, it is assumed that the transport block has M=7 code blocks, which can be divided into N0=2 sets. The first 4 code blocks constitute a first code block set, and the latter 3 code blocks constitute a second code block set. The indication information of joint coding of the triggered error level indication information and the ACK acknowledgment information is represented by 2 bits, herein 00 represents ACK, that is, the CRC of the transport block passes, 01 represents that the first code block set is correct, 10 represents that the second code block set is correct, and 11 represents that both of the code block sets are erroneous.

Secondly, for example, it is assumed that the transport block has M=7 code blocks, which can be divided into N0=3 sets. The first 3 code blocks constitute a first code block set, the subsequent 2 code blocks constitute a second code block set, and final 2 code blocks constitute a third code block set. The indication information of joint coding of the triggered error level indication information and the ACK acknowledgment information is represented by 3 bits, herein 000 represents ACK, that is, the CRC of the transport block passes, 001 represents that the first code block set is erroneous, 010 represents that the second code block set is erroneous, 011 represents that the third code block set is erroneous, 100 represents that the first and second code block sets are erroneous, 101 represents that the second and third code block sets are erroneous, 110 represents that the first and third code block sets are erroneous, and 111 represents that all of the code block sets are erroneous.

In step 602, the terminal transmits the indication information of joint coding of the triggered error level indication information and the ACK acknowledgment information to the base station through the PUCCH.

Herein, terminal transmits the HARQ acknowledgment information on an n$^{th}$ subframe, and transmits the triggered retransmission number indication information in an (n+k)$^{th}$ subframe, where k is a fixed value or a value in a set of not more than 10 fixed values. k is one of a set of 10 fixed values {10, 9, 8, 7, 6, 5, 4, 3, 2, 1}.

With the above solution, if the data transmission level indication information includes the code block set error pattern indication information, it can improve the efficiency and the performance of the link adaptation technology of HARQ.

Example 6

Figure 7:
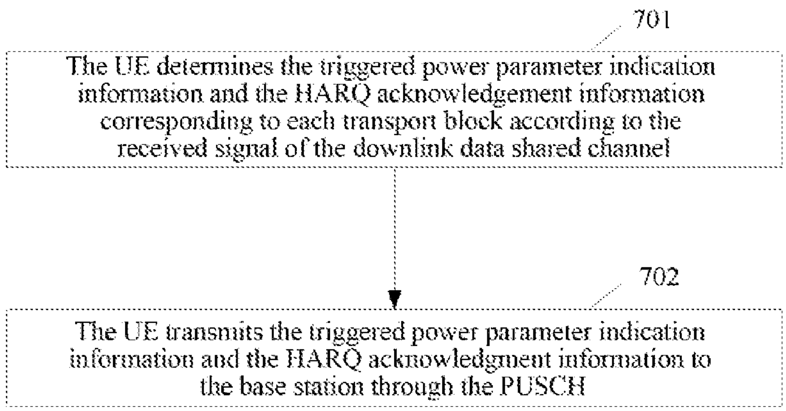
FIG. 7 is flowchart seven of a method for processing feedback information according to an embodiment of the present invention.

The above embodiment will be described below by taking the data transmission level indication information being determined by the power parameter level indication information, the first transmission node being a UE, and the second transmission node being a base station as an example. As shown in FIG. 7, the embodiment includes the following steps.

In step 701, the UE determines the triggered power parameter indication information and the HARQ acknowledgement information corresponding to each transport block according to the received signal of the downlink data shared channel; wherein, the power parameter mainly reflects power or absolute power required to be adjusted of the PDSCH.

Herein the triggered power parameter indication information indicates N power parameter levels, where N is a positive integer greater than or equal to 2. The base station may realize power control or rate control according to the power parameter. This power parameter is primarily defined as a power ratio of the data shared channel relative to a reference signal.

The method of acquiring the triggered power parameter indication information includes the following manners.

In a first manner, the error level indication information is firstly acquired, and then the triggered power parameter level information is acquired according to the error level indication information. Specifically, the received transport block is respectively decoded to acquire error rate information of the transport block. According to the error rate information, the power parameter indication information is calculated in accordance with some mapping rule (a correspondence relation between an error rate range and a power parameter).

In a second manner, the triggered power parameter level indication information is directly acquired.

The method of acquiring the power parameter level indication information required to be adjusted includes:

on condition of true transmission of the data shared channel PDSCH (in a case of all the conditions being unchanged except allowing a modulation and coding scheme changeable), determining power of the PDSCH required to be adjusted to receive a transport block at a target error rate P on a corresponding resource of the data shared channel PDSCH, herein a basic power parameter is a corresponding power parameter value used for true transmission on the PDSCH, and where P is a real number between 0 and 1.

In step 702, the UE transmits the triggered power parameter indication information and the HARQ acknowledgment information to the base station through the PUSCH.

Herein, the terminal transmits the HARQ acknowledgment information on an $n^{th}$ subframe, and transmits the triggered power parameter indication information on an $(n+k)^{th}$ subframe, where k is a fixed value or a value in a set of not more than 10 fixed values. k is a value in a set of 10 fixed values, which is {10, 9, 8, 7, 6, 5, 4, 3, 2, 1}.

With the above solution, it is possible for the second transmission node to quickly achieve link adaptation according to the channel quality indication information transmitted by the first transmission node. If the data transmission level indication information includes the triggered channel quality indication information, the problem of the inaccuracy of the CQI, for example, the inaccuracy of the OLLA, can be solved well.

Example 7

Figure 8:
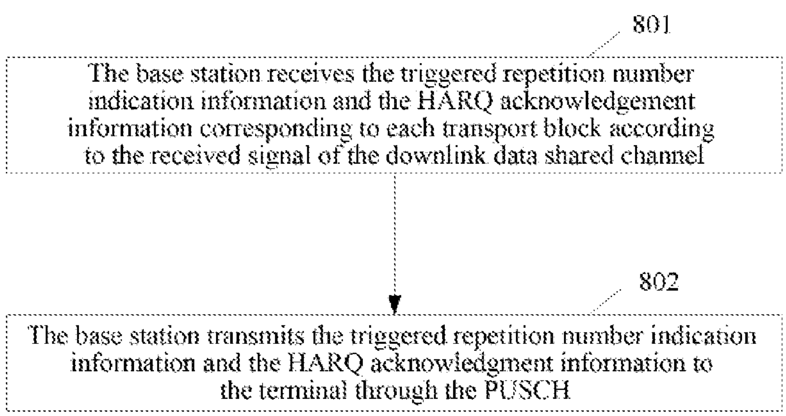
FIG. 8 is flowchart eight of a method for processing feedback information according to an embodiment of the present invention.
Figure 9:
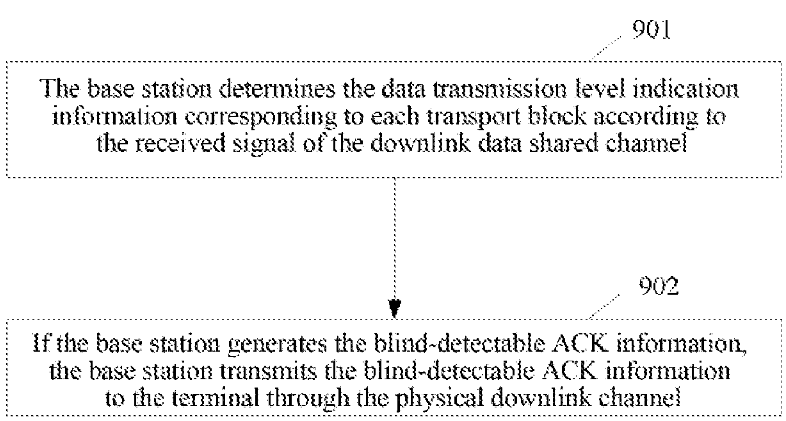
FIG. 9 is flowchart nine of a method for processing feedback information according to an embodiment of the present invention.

The above embodiment will be described below by taking the data transmission level indication information being determined by the repetition number level indication information which is primarily applied in an MTC or Massive Machine Communication (MMC) scenario, particularly, a scenario of uplink coverage enhancement, the first transmission node being a base station eNodeB, and the second transmission node being a terminal UE as an example. As shown in FIG. 8, the embodiment includes the following steps.

In step 801, the base station receives the triggered repetition number indication information and the HARQ acknowledgement information corresponding to each transport block according to the received signal of the downlink data shared channel; herein, the repetition number indication information mainly reflects the number of retransmissions required to be additionally added in the MTC scenario for correctly transmitting or receiving a transport block of the current PDSCH at a target BLER.

The method for acquiring the number of retransmissions is similar to that of the previous embodiment.

In step 802, the base station transmits the triggered repetition number indication information and the HARQ acknowledgment information to the terminal through the PUSCH.

Herein, the terminal transmits the HARQ acknowledgment information on an $n^{th}$ subframe, and transmits the triggered retransmission number indication information on an $(n+k)^{th}$ subframe, where k is a fixed value or a value in a set of not more than 10 fixed values. k is a value in a set of 10 fixed values, which is {10, 9, 8, 7, 6, 5, 4, 3, 2, 1}.

With the solution according to the present invention, when the HARQ is fed back, the number of subsequent retransmissions is indicated, and the base station only needs to detect decoding at the preset retransmission number. If the decoding is correct, the transmission is successful; otherwise, the next HARQ transmission is continued.

With the above solution, it is possible for the second transmission node to quickly achieve link adaptation according to the data transmission level indication information transmitted by the first transmission node. Under an MTC scenario, a retransmission number can be dynamically controlled, and there is no need to reserve a feedback channel for each subframe, which realizes the control of the repetition number at a subframe level, and realizes rateless transmission, thus significantly improving the efficiency of the link adaptation under the MTC scenario, and thereby enhancing the system capacity and performance.

Example 8

The above embodiment will be described below by taking the data transmission level indication information being determined by the blind-detectable ACK information which is primarily applied in an MTC or MMC scenario, particularly, a scenario of uplink coverage enhancement, the first transmission node being a base station eNodeB, and the second transmission node being a terminal UE as an example. The embodiment includes the following steps.

In step 901, the base station determines the data transmission level indication information, i.e. blind-detectable ACK, corresponding to each transport block according to the received signal of the downlink data shared channel; herein if the transport block of the PUSCH is correctly received, the blind-detectable ACK is generated.

Herein, the blind-detectable ACK refers to that the terminal can detect a predefined resource, and if the base station transmits the ACK information, the resource can at least carry the ACK information, the second transmission node can detect the ACK information on the resource, and if the base station does not transmit the ACK information, the resource can be used to carry other control information or data; and in addition, for the shared channel, the base station can only transmit the ACK acknowledgment information and cannot transmit other acknowledgment information.

In step 902, if the base station generates the blind-detectable ACK information, the base station transmits the blind-detectable ACK information to the terminal through the physical downlink channel.

It should be pointed out that the ACK/NACK feedback of the traditional LTE does not have a function of blind detection, and in fact, does not ever have a concept of blind detection of the ACK. In this case, there must be an ACK feedback on each subframe to ensure that data transmission is stopped in the uplink in any subframe position, which brings a fatal ACK feedback overhead. In the present invention, the blind detection of the ACK is proposed for the first time, and an ACK with a function of blind detection is transmitted once only after correctly receiving. The base station can perform blind detection on each subframe. If nothing is detected, the terminal retransmits the data, and once it is detected, data transmission is stopped. As the ACK only needs to be fed back once, the ACK feedback overhead is acceptable.

With the above solution, it is possible for the second transmission node to quickly achieve link adaptation according to the data transmission level indication information transmitted by the first transmission node. Under an MTC scenario, a retransmission number can be dynamically controlled, and there is no need to reserve a feedback channel for each subframe, which realizes the control of the repetition number at a subframe level, and realizes rateless transmission, thus significantly improving the efficiency of the link adaptation under the MTC scenario, and thereby enhancing the system capacity and performance.

Method Embodiment Two

Figure 10:
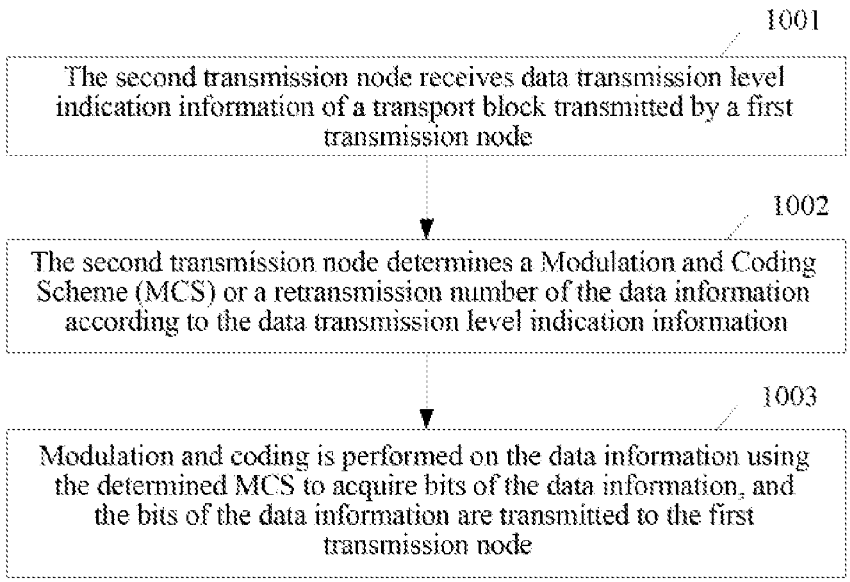
FIG. 10 is flowchart ten of a method for processing feedback information according to an embodiment of the present invention.

In a wireless communication system, the present invention provides a method for processing feedback information applied in a second transmission node, as shown in FIG. 10, including the following steps.

In step 1001, the second transmission node receives data transmission level indication information of a transport block transmitted by a first transmission node.

In step 1002, the second transmission node determines a Modulation and Coding Scheme (MCS) or a retransmission number of data information according to the data transmission level indication information.

The first transmission node is a terminal and the second transmission node is a base station; or the first transmission node is a base station and the second transmission node is a base station.

Alternatively, after the above step 602 is completed, step 1003 may further be included. In step 1003, modulation and coding is performed on the data information using the determined MCS to acquire processed data, and the processed data is transmitted to the first transmission node.

Alternatively, before the above step 602 is completed, the method may further include: receiving CQI information transmitted by the first transmission node.

Herein, the data transmission level indication information includes one of the following: error level indication information, soft ACK/NACK information, triggered channel quality indication information, and indication information of joint coding of the triggered channel quality indication information and the ACK. Herein, the soft ACK/NACK information is indication information of joint coding of the error level indication and the ACK.

Alternatively, the data transmission level indication information includes at least one of the following: triggered error level indication information, triggered channel quality indication information, triggered power parameter level indication information, triggered repetition level indication information, triggered blind-detectable Acknowledgement (ACK) information, soft ACK/Negative Acknowledgement (NACK) information, indication information of joint coding of triggered channel quality indication information or a triggered power parameter level or a triggered repetition number level and ACK positive acknowledgement information, or indication information of joint coding of triggered channel quality level information or a triggered power parameter level or a triggered repetition number level and Hybrid Automatic Repeat Request (HARQ) acknowledgment information; herein the soft ACK/NACK information is indication information of joint coding of the error level indication information and the ACK.

Alternatively, the method further includes: the second transmission node receiving Channel Quality Indication (CQI) information transmitted by the first transmission node, wherein the second transmission node further needs to determine a modulation and coding scheme of the data information according to the data transmission level Indication information.

Alternatively, the data information includes one of the following: a transport block, a set of code blocks of the transport block, and redundant packets obtained by performing packet coding on a system code of the transport block.

Alternatively, the data transmission level indication information includes code block set error pattern level indication information; and correspondingly, the method further includes: the second transmission node determining a set of erroneous code blocks of the transport block according to the code block set error pattern level indication information, herein the data information is the set of erroneous code blocks of the transport block.

Alternatively, the data transmission level indication information includes packet error rate or code block error rate level indication information; and correspondingly, the method further includes: if the packet error rate or the code block error rate is lower than a threshold P0, the second transmission node performing packet coding on a system code of K0 data packets of the transport block to acquire M0 redundant packets, herein the data information is the M0 redundant packets; and if the packet error rate is higher than a threshold value, not performing packet coding, herein the data information is the transport block.

Herein the transport block and the X0 padding bits can be divided into K0 data packets of the same size, K0 and M0 are positive integers greater than or equal to 1, and X0 is a positive integer greater than or equal to 0.

For example, a transport block size is 6144*3 bits, which can be divided into K0=6144 data packets with the same size. Assuming M0=1, an $i^{th}$ bit of a redundant packet is a result of exclusive OR of $i^{th}$ bits of all the three data packets, where i is from 0 to 6143. Roughly speaking, the redundant packet is acquired by exclusive OR of three data packets. This packet coding is a coding manner of an erasure code. Packet coding can also be implemented by using various erasure codes.

It should be pointed out that in a typical condition, if there is no padding bit, one packet is a coded block. On the decoding side, a CRC of each coded block may be used to judge whether a corresponding packet is decoded correctly. If it is decoded correctly, the packet is a packet which is successfully transmitted; otherwise, the packet is a lost packet (or erase packet).

Alternatively, the error level indication information is used to indicate level information of an error degree and/or error pattern, which includes at least one of the following: bit error rate level information, code block error rate level information, packet error rate level information, code block set error pattern level information, code block error number level information, and packet error number level information.

Alternatively, the error level indication information indicates N levels, and different error level indication information indicates different error rate ranges; herein an error rate range is defined by an error rate threshold, and different error rate thresholds are fixed or are semi-statically configured by a base station; and N is a positive integer greater than or equal to 2.

Alternatively, the error level indication information indicates N levels, and different error levels indicate different code block set error pattern levels; and a transport block is divided into M code blocks which are divided into NO sets, and the code block set error pattern level indication information is used to indicate whether each code block set is decoded wrongly or indicate the number of erroneous code block sets; herein if at least one code block in a code block set is erroneous, the code block set is an erroneous code block set.

Alternatively, the triggered error level indication information, the channel quality indication information, the power parameter level indication information, or the repetition number level indication information is level indication information triggered by the data shared channel or HARQ acknowledgment information or downlink grant information.

Alternatively, the triggered channel quality indication information indicates M levels, different channel quality indication information indicates different adjusted channel quality levels or channel quality levels; and a step for adjusting the CQI is fixed or is semi-statically configured by a base station; where M is a positive integer greater than or equal to 2.

Alternatively, the triggered channel quality indication information is a required channel quality indication level or a channel quality indication level required to be adjusted for correctly receiving or receiving a transport block at a target error rate by the first transmission node on a corresponding resource of the data shared channel.

Alternatively, the triggered power parameter level indication information is a power parameter level in a unit of dB required to be adjusted for correctly receiving or receiving the transport block at a target error rate by the first transmission node on a corresponding resource of the data shared channel.

Alternatively, the triggered repetition number level indication information is a retransmission number or a retransmission number required to be adjusted for correctly receiving or receiving the transport block at a target error rate by the first transmission node on a corresponding resource of the data shared channel.

Alternatively, the second transmission node receiving data transmission level indication information corresponding to the transport block transmitted by the first transmission node includes:

the second transmission node receiving the data transmission level indication information corresponding to the transport block transmitted by the first transmission node through the data shared channel or a control channel.

Alternatively, the second transmission node receives the triggered error level indication information, the triggered channel quality indication information, the triggered power parameter level indication information, or the triggered repetition number level indication information together with the HARQ acknowledgment information transmitted by the first transmission node through the data shared channel; or the second transmission node receives indication information of joint coding of the triggered error level indication information, the triggered channel quality indication information, the triggered power parameter level indication information, or the triggered repetition number level indication information and the ACK or the HARQ acknowledgement information transmitted by the first transmission node through the control channel.

Alternatively, the second transmission node receiving the data transmission level indication information transmitted by the first transmission node through the data shared channel or the control channel includes: if the second transmission node receives the HARQ acknowledgement information through a control channel on an $n^{th}$ subframe, receiving the triggered error level indication information, the triggered channel quality indication information, the triggered power parameter level indication information, or the triggered repetition number level indication information through another control channel or data shared channel on an $(n+k)^{th}$ subframe, where n is any positive integer and k is a fixed value or a value in a set of not more than 10 fixed values.

Alternatively, the second transmission node receiving the data transmission level indication information transmitted by the first transmission node through the data shared channel or the control channel includes: if the second transmission node receives the transport block through the data shared channel on an $n^{th}$ subframe, receiving the triggered error level indication information, the triggered channel quality indication information, the triggered power parameter level indication information, or the triggered repetition number level indication information through another control channel or data shared channel on an $(n+k)^{th}$ subframe, where n is any positive integer and k is a fixed value or a value in a set of not more than 10 fixed values.

Alternatively, the second transmission node receiving the data transmission level indication information transmitted by the first transmission node through the data shared channel or the control channel includes: if a request indication field is 1, triggering feedback of the error level indication information, the channel quality indication information, the power parameter level indication information, the repetition number level indication information together with the HARQ acknowledgement information, and if the request indication field is reserved or is 0, not triggering the feedback information, herein an grant control information format corresponding to the data shared channel includes the request indication field.

Alternatively, the second transmission node receiving the data transmission level indication information transmitted by the first transmission node through the data shared channel or the control channel includes: if the second transmission node receives an grant control information format through the control channel on an nth subframe, receiving trigged channel quality indication information of one or two transport blocks of the data shared channel corresponding to the downlink grant through PUCCH or PUSCH on an (n+k)th subframe, where n is any positive integer and k is a fixed value or a value in a set of not more than 10 fixed values.

Alternatively, the second transmission node receiving the data transmission level indication information transmitted by the first transmission node through the data shared channel or the control channel includes: if a request indication field is 1, triggering feedback of the error level indication information, the channel quality indication information, the power parameter level indication information, the repetition number level indication information together with the HARQ acknowledgement information, and if the request indication field is reserved or is 0, not triggering the feedback information, herein the grant control information format includes the request indication field.

Alternatively, the second transmission node receiving the data transmission level indication information transmitted by the first transmission node through the data shared channel or the control channel includes: the terminal receiving the HARQ acknowledgment information and one of the following on an $n^{th}$ subframe at the same time: the error level indication information, the channel quality indication information, the power parameter level indication information and the repetition number level indication information.

Alternatively, determining the MCS of the data information includes:

predicting an initial Signal to Interference Plus Noise Ratio (SINR) 0 according to the CQI information; perform adjustment of a second time on the SINR0 according to the data transmission level indication information to acquire SINR2; and determining the MCS of the data information according to the SINR2 acquired after the adjustment and according to a preset SINR and MCS correspondence table.

Herein the data transmission level indication information includes at least one of the following: the triggered error level indication information, the triggered channel quality indication information, and the triggered power parameter level indication information.

Alternatively, determining the retransmission number of the data information includes:

adjusting SINR0 according to the data transmission level indication information to acquire SINR2; and determining the MCS of the data information according to the SINR2 acquired after the adjustment and according to a preset SINR and MCS correspondence table.

Herein the data transmission level indication information includes at least one of the following: the triggered error level indication information, the triggered channel quality indication information, and the triggered power parameter level indication information.

Alternatively, after determining the MCS of the transport block, the method further includes:

implementing modulation and coding at a predefined MCS level to acquire bits of code words and retransmitting the bits of the code words to the first transmission node according to a repetition number level indication information of the data transmission level indication information.

Herein the data transmission level indication information includes at least one of the following: the triggered error level indication information, the triggered channel quality indication information, and the triggered power parameter level indication information.

Alternatively, after determining the MCS of the transport block, the method further includes:

detecting the positive acknowledgment information ACK on a preset candidate resource, if the information is not detected, implementing modulation and coding at a predefined MCS level to acquire bits of code words, and retransmitting the bits of the code words to the first transmission node, and if it is detected, stopping retransmission of the data.

Herein the data transmission level indication information at least includes the triggered blind-detectable positive acknowledgement ACK information.

Example 1

Figure 11:
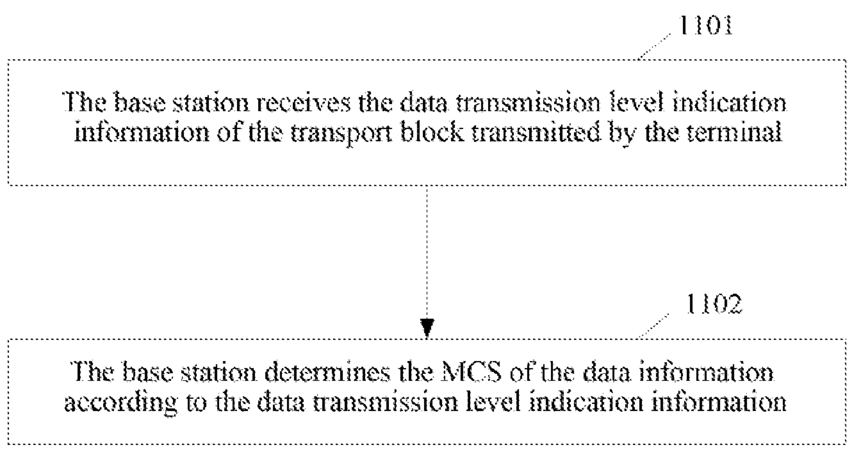
FIG. 11 is a flowchart of a method for determining an MSC in the method for processing feedback information according to an embodiment of the present invention.

In the following, by taking the error level indication information indicated in the data transmission level indication information being an error rate level (including a BCER or a PER or a BER) corresponding to the transport block, the first transmission node being a UE and the second transmission node being a base station as an example, determination of the MCS of the transport block may be shown in FIG. 11, which may specifically include the following steps.

In step 1101, the base station receives the data transmission level indication information of the transport block transmitted by the terminal.

In step 1102, the base station determines the MCS of the data information based on the data transmission level indication information.

Herein, the data transmission level indication information is a level of an error degree when the error level indication information indicates that the data is decoded wrongly, which is divided into N levels, where N is a positive integer larger than or equal to 2. If N=2, it is divided into two levels, i.e., a high error level and a low error level. Here, the error level is represented by the BCER of the transport block. Here, the data information is the transport block.

The method may further include: performing modulation and coding on the data information using the determined modulation and coding scheme to acquire processed data, and transmitting the processed data to the first transmission node.

Alternatively, the method may further include: receiving CQI information transmitted by the first transmission node.

Figure 12:
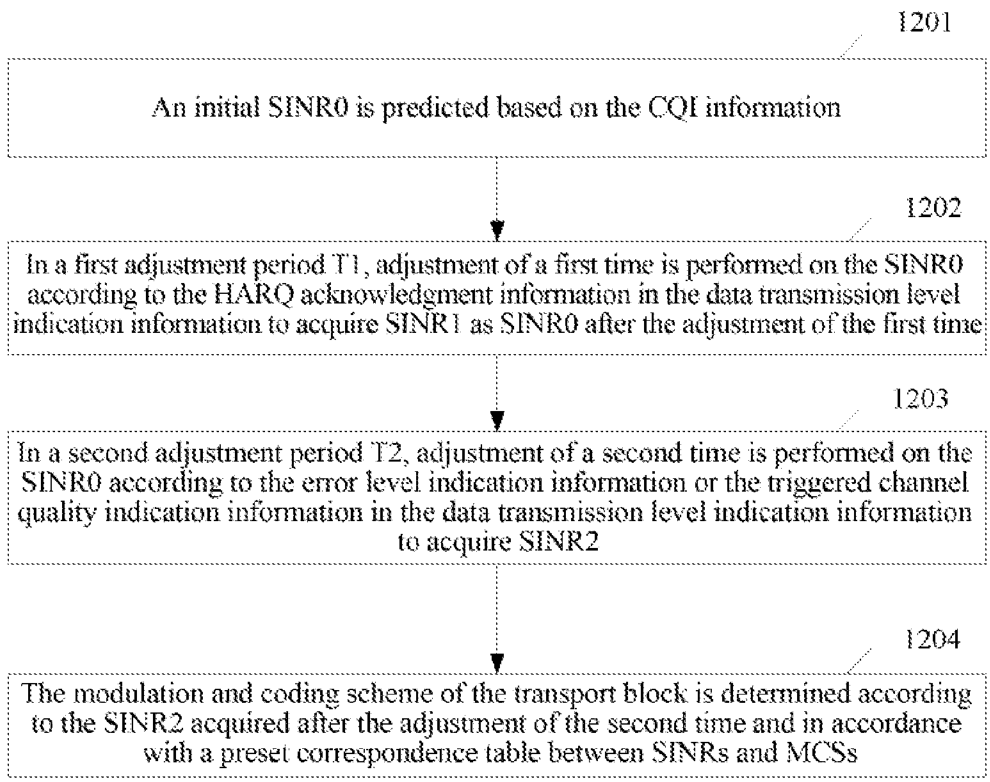
FIG. 12 is a flowchart for determining an MSC according to an embodiment of the present invention.

Herein, the base station determining the MCS of the data information according to the data transmission level indication information, as shown in FIG. 12, includes the following specific steps.

In step 1201, an initial SINR0 is predicted based on the CQI information.

In step 1202, in a first adjustment period T1, adjustment of a first time is performed on the SINR0 according to the HARQ acknowledgment information in the data transmission level indication information to acquire SINR1 as SINR0 after the adjustment of the first time.

Herein, the adjustment may be calculated according to the following equation: SINR1=SINR0+ΔSNR1, herein, ΔSNR1 is acquired according to the HARQ acknowledgment information in the data level indication information transmitted by the terminal.

in step 1203, in a second adjustment period T2, adjustment of a second time is performed on the SINR0 according to the error level indication information or the triggered channel quality indication information in the data transmission level indication information to acquire SINR2.

Herein, the adjustment may be calculated using the SINR1 acquired after the adjustment of the first time, which specifically is: SINR2=SINR1+ΔSNR2, herein, ΔSNR2 is acquired according to the error level indication information in the data transmission level indication information transmitted by the terminal.

Specifically, ΔSNR2 is calculated according to the error rate information BCER in accordance with some mapping rule (a correspondence relationship between an error rate range and SNRs).

In step 1204, the modulation and coding scheme of the transport block is determined according to the SINR2 acquired after the adjustment of the second time and in accordance with a preset correspondence table between SINRs and MCSs.

Example 2

The above embodiment will be described below by taking the data transmission level indication information being the triggered channel quality indication information, the first transmission node being a UE, and the second transmission node being a base station as an example.

The base station receives the data transmission level indication information of the transport block transmitted by the terminal; and the base station determines the MCS of the data information based on the data transmission level indication information.

Herein, the data information is the transport block, and the data transmission level indication information is the triggered channel quality indication information.

The method may further include: performing modulation and coding on the data information using the determined modulation and coding scheme to acquire processed data, and transmitting the processed data to the first transmission node.

Alternatively, the method may further include: receiving CQI information transmitted by the first transmission node.

Herein, the base station determining the MCS of the data information according to the data transmission level indication information includes:

predicting an initial SINR0 based on the CQI information; and performing the adjustment of the second time on the SINR0 according to the data transmission level indication information, i.e., the triggered channel quality indication information to acquire SINR2=SINR0+ΔSNR2.

Specifically, ΔSNR2 is calculated according to the triggered channel quality indication information in accordance with some proportional mapping rule (a correspondence relationship between CQIs and SNRs).

The MCS of the data information is determined according to the SINR2 acquired after the adjustment and in accordance with a preset correspondence table between SINRs and MCSs.

Example 3

The above embodiment will be described below by taking the error level indication information being the data transmission level indication information, the error level indication information being the code block set error pattern level information, the first transmission node being a UE, and the second transmission node being a base station eNodeB as an example. The embodiment includes the following steps: the base station receiving the data transmission level indication information of the transport block transmitted by the terminal.

Herein, the error level indication information indicates N levels, and different error levels indicate different code block set error patterns; and one transport block is divided into M code blocks which are divided into NO sets; and the code block set error pattern level indication information is used to indicate whether each code block set is decoded wrongly or indicate the number of erroneous code block sets; herein if at least one code block in the code block set is erroneous, the code block set is an erroneous code block set.

Firstly, for example, it is assumed that the transport block has M=7 code blocks, which can be divided into N0=2 sets. The first 4 code blocks constitute a first code block set, and the latter 3 code blocks constitute a second code block set. The indication information of joint coding of the triggered error level indication information and the ACK acknowledgment information is represented by 2 bits, herein 00 represents ACK, that is, the CRC of the transport block passes, 01 represents that the first code block set is correct, 10 represents that the second code block set is correct, and 11 represents that both of the code block sets are erroneous.

The base station determines the MCS of the data information according to the data transmission level indication information.

Modulation and coding is performed on the data information using the determined modulation and coding scheme to acquire processed data, and the processed data is transmitted to the terminal. Herein, the data information is a set of erroneous code blocks of the transport block.

Alternatively, the method may further include: receiving conventional CQI information transmitted by the terminal.

Herein, the base station determining the MCS of the data information according to the data transmission level indication information includes: determining the MCS according to the conventional CQI information transmitted by the terminal.

Example 4

The above embodiment will be described below by taking the error level indication information being the data transmission level indication information, the error level indication information being packet error rate or code block error rate level information, the first transmission node being a UE, and the second transmission node being a base station eNodeB as an example. The embodiment includes the following steps: the base station receives the data transmission level indication information of the transport block transmitted by the terminal.

Herein, the error level indication information indicates N levels, and different error levels indicate different packet error rate levels or code block error rate levels.

The base station determines the MCS of the data information according to the data transmission level indication information. Herein, the data information is defined as follows: if the packet error rate or the code block error rate is lower than a threshold P0, the base station further performs packet coding on a system code of K0 data packets of the transport block to acquire M0 redundant packets, and the data information is the M0 redundant packets. If the packet error rate or the code block error rate is higher than a threshold, packet coding is not performed, and the data information is a transport block.

Modulation and coding is performed on the data information using the determined modulation and coding scheme to acquire processed data, and the processed data is transmitted to the terminal. Herein, the data information is a redundant packet or a transport block.

Alternatively, the method may further include: receiving conventional CQI information transmitted by the terminal.

Herein, the base station determining the MCS of the data information according to the data transmission level indication information includes: determining the MCS according to the conventional CQI information transmitted by the terminal.

Example 5

The above embodiment will be described below by taking the data transmission level indication information being determined by the power parameter level indication information, the first transmission node being a UE, and the second transmission node being a base station as an example.

The above embodiment will be described below by taking the data transmission level indication information being the triggered channel quality indication information, the first transmission node being a UE, and the second transmission node being a base station as an example.

The base station receives the data transmission level indication information of the transport block transmitted by the terminal; and the base station determines the MCS of the data information based on the data transmission level indication information.

Herein, the data information is the transport block, the data transmission level indication information is the triggered power parameter indication information, and the power parameter reflects power of the PDSCH, which is generally defined as a ratio between the power of the PDSCH and power of a reference signal.

The method may further include: performing modulation and coding on the data information using the determined modulation and coding scheme to acquire processed data, and transmitting the processed data to the first transmission node.

Alternatively, the method may further include: receiving CQI information transmitted by the first transmission node.

Herein, the base station determining the MCS of the data information according to the data transmission level indication information includes:

predicting an initial SINR0 based on the CQI information; and performing adjustment of a second time on the SINR0 according to the data transmission level indication information, i.e., the triggered power parameter indication information to acquire SINR2=SINR0+ΔSNR2.

Specifically, ΔSNR2 is calculated according to the triggered power parameter indication information in accordance with some proportional mapping rule (a correspondence relationship between power parameters and SNRs).

The MCS of the data information is determined according to the SINR2 acquired after the adjustment and in accordance with a preset correspondence table between SINRs and MCSs.

Example 6

The above embodiment will be described below by taking the data transmission level indication information being determined by the repetition number level indication information which is primarily applied in an MTC or MMC scenario, particularly, a scenario of uplink coverage enhancement, the first transmission node being a base station eNodeB, and the second transmission node being a terminal UE as an example.

The terminal receives the data transmission level indication information of the transport block transmitted by the base station; and the terminal determines a retransmission number K of the data information according to the data transmission level indication information, where K is an integer greater than 1.

It further includes: implementing modulation and coding at a predefined MCS level to acquire processed data as one HARQ transmission and retransmitting the processed data to the base station for K times according to the retransmission number. For example, the predefined MCS is a lowest MCS level.

It further includes: the base station receiving processed data of K retransmissions as one HARQ transmission, performing a demodulation and decoding process on the received data, if the process is successful, reporting an ACK, and if it is failed, reporting an NACK and a retransmission number for the next HARQ transmission.

Example 7

The above embodiment will be described below by taking the data transmission level indication information being determined by the blind-detectable ACK information which is primarily applied in an MTC or MMC scenario, i.e., a scenario of uplink coverage enhancement, the first transmission node being a base station eNodeB, and the second transmission node being a terminal UE as an example.

The terminal receives the data transmission level indication information of the transport block transmitted by the base station; herein the data transmission level indication information at least includes the triggered blind-detectable positive acknowledge ACK information.

The terminal determines to stop data retransmission according to the data transmission level indication information. It further includes: the terminal detecting the positive acknowledgment information ACK on a preset candidate resource, if the information is not detected, implementing modulation and coding at a predefined MCS level to acquire processed data information, and retransmitting the processed data information to the base station all the time, and if the positive acknowledgement ACK information transmitted by the base station is detected, the terminal stopping data retransmission, in which case the data transmission process ends.

It further includes: the base station receiving processed data of T retransmissions in accordance with T subframes as one transmission, performing a demodulation and decoding process on the received data, if the process is successful, acquiring the transport block, and transmitting blind detected positive acknowledgement ACK information to the terminal; otherwise, not transmitting. Where, T is greater than or equal to 1.

Apparatus Embodiment One

Figure 13:
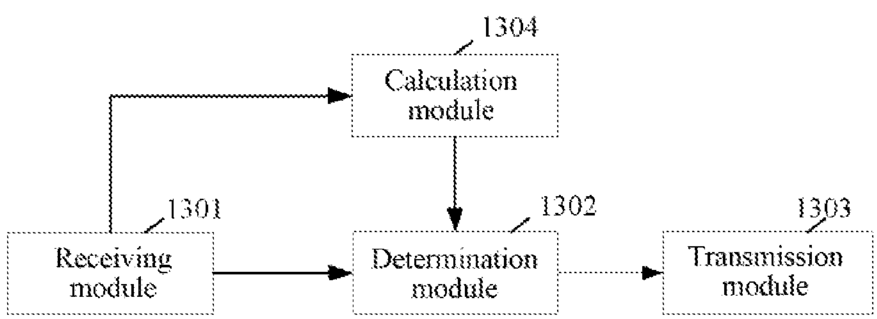
FIG. 13 is a constitutional structural diagram of a first transmission node according to an embodiment of the present invention.
Figure 14:
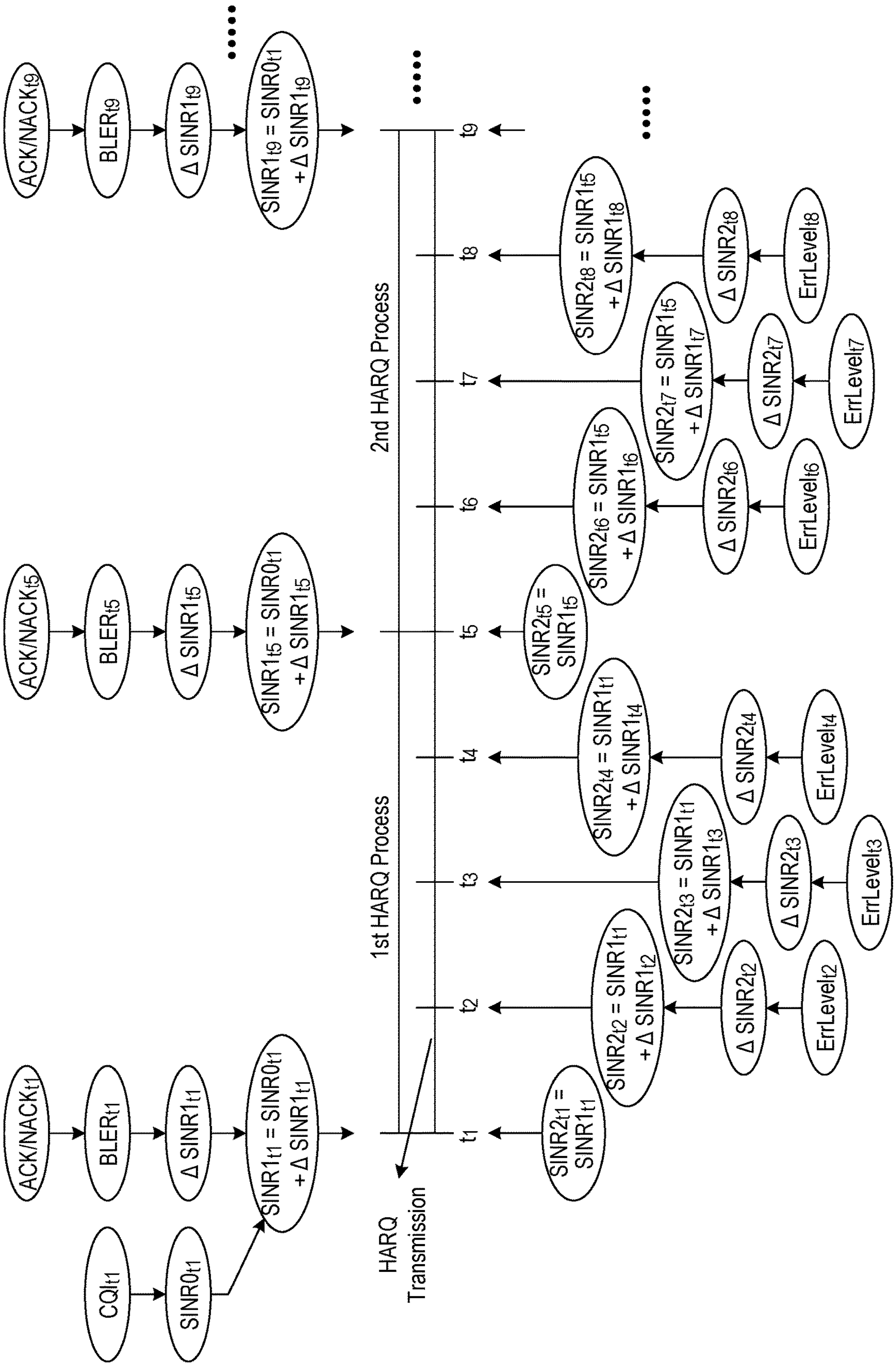
FIG. 14 is a diagram of a processing logic in the first transmission node according to an embodiment of the present invention.

The present invention provides a transmission node, as shown in FIG. 13, including:

- a receiving module 1301 configured to receive a signal of a downlink data shared channel;
- a determination module 1302 configured to determine data transmission level indication information of a transport block according to the signal; and
- a transmission module 1303 configured to transmit the data transmission level indication information corresponding to the transport block to a second transmission node.

Herein, the data transmission level indication information includes at least one of: triggered error level indication information, triggered channel quality indication information, triggered power parameter level indication information, triggered repetition number level indication information, triggered blind-detectable Acknowledgement (ACK) information, soft ACK/Negative Acknowledgement (NACK) information, indication information of joint coding of triggered channel quality level indication information or triggered power parameter level or triggered repetition number level and an ACK positive acknowledgement information, or indication information of joint coding of triggered channel quality level indication information or triggered power parameter level or triggered repetition number level and a Hybrid Automatic Repeat Request (HARQ) acknowledgment information. Herein, the soft ACK/NACK information is indication information of joint coding of the error level indication information and the ACK.

The error level indication information indicates N levels, and different error level indication information indicates different error rate ranges; herein an error rate range is defined by an error rate threshold, and different error rate thresholds are fixed or are semi-statically configured by a base station; and N is a positive integer greater than or equal to 2.

The error level indication information indicates N levels, and different error level indication information indicates different code block set error patterns; and a transport block is divided into M code blocks which are divided into N0 sets.

The code block set error pattern level indication information is used to indicate whether each code block set is decoded wrongly or indicate the number of erroneous code block sets; wherein when at least one code block in the code block set is decoded wrongly, the code block set is an erroneous code block set.

The triggered error level indication information, the channel quality indication information, the power parameter level indication information, or the repetition number level indication information is level indication information triggered by the data shared channel or HARQ acknowledgment information or downlink grant information.

The triggered channel quality indication information indicates M levels, different channel quality indication information indicates different adjusted channel quality indication CQI levels or channel quality indication levels.

Herein a step for adjusting the CQI is a fixed step or is semi-statically configured by the second transmission node; and M is a positive integer greater than or equal to 2.

The triggered channel quality indication information is a channel quality indication level on a corresponding resource of the data shared channel, or a channel quality indication level required to be adjusted for correctly receiving or receiving a transport block at a target error rate on a corresponding resource of the data shared channel.

The triggered power parameter level indication information is a power parameter level required to be adjusted for correctly receiving or receiving the transport block at a target error rate on a corresponding resource of the data shared channel, herein the power parameter level is in a unit of dB.

The triggered repetition number level indication information is a retransmission number or a retransmission number required to be adjusted for correctly receiving or receiving the transport block at a target error rate on a corresponding resource of the data shared channel.

The channel quality indication information is used to determine a CQI adjustment level.

The determination unit is configured to determine an error level in the data transmission level indication information; herein determining an error level in the data transmission level indication information includes: determining the error level according to a Block Code Error Rate (BCER) of data of the decoded transport block; determining the error level according to a Bit Error Rate (BER) of data of the decoded transport block; or determining the error level according to a Packet Error Rate (PER) or a Frame Error Rate (FER) of data of the decoded transport block, herein a size of a packet may be not equal to a size of a code block.

The transmission node further includes: a calculation module 1304 configured to calculate the BCER.

The calculation module 1304 is configured to divide the transport block acquired by the receiving module 1301 into M code blocks, and to respectively code and then transmit the M code blocks, and decode, by the UE, the received data of the transport block to acquire L code blocks which are successfully decoded. The decoded block error rate BCER of the transport block is equal to L/M, where L is a positive integer greater than or equal to 0 and M is a positive integer greater than or equal to 1.

The calculation module 1304 is configured to divide the transport block into one or more code blocks, and each code block is configured with a code block CRC; the UE detects the code block CRC one by one and acquires the number of erroneous bits of the code block when the CRC detection does not pass; and so on, it is to acquire and accumulate numbers of erroneous bits of all code blocks corresponding to the transport block, and divide a result of the accumulation by a transport block size to obtain a BER.

The calculation module 1304 is configured to divide the transport block into one or more code blocks, and each code block is configured with a code block CRC; the UE decodes various code blocks one by one to acquire a log likelihood ratio of information bits; it is to compare an absolute value of the log likelihood ratio of all the information bits of the code block with a preset threshold, the number of bits larger than the threshold is used as the number of erroneous bits of the code block, it is to accumulate the total number of the all erroneous bits corresponding to the code blocks, and then divide a result of the accumulation by the transport block size to acquire the BER.

The calculation module 1304 is configured to divide the transport block into one or more code blocks, and each code block is configured with a code block CRC; the UE decodes each code block to acquire extrinsic information corresponding to all the information bits in the code block; it is to compare an absolute value of the extrinsic information of all the information bits of the code block with a preset threshold, and the number of bits larger than the threshold is used as the number of erroneous bits of the code block, and so on, it is to acquire and accumulate numbers of erroneous bits of all code blocks, and divide a result of the accumulation by a transport block size to obtain a BER.

The transmission module 1303 is configured to transmit, by the UE, the data transmission level indication information to the base station through the PUSCH or the PUCCH; alternatively, transmit, by the UE, the error level indication information and the HARQ acknowledgment information, or the triggered channel quality indication level information and the HARQ acknowledgment information, to the base station through the PUSCH; alternatively, transmit, by the UE, the join-coded indication information of the error level indication information and the ACK to the base station through the PUCCH.

Herein, the terminal UE transmitting the error level indication information and the HARQ acknowledgment information, or the triggered channel quality indication information and the HARQ acknowledgment information to the base station through the PUCCH or the PUSCH includes: if the HARQ acknowledgement information is transmitted by the terminal through a PUCCH on an nth subframe, transmitting the error level indication information or triggered channel quality indication information through another PUCCH or a PUSCH on an (n+k)th subframe, where n is any positive integer and k is a fixed value or a value in a set of not more than 10 fixed values. Further, only when the HARQ acknowledgment information is an ACK, the error level indication information or the triggered channel quality indication information is transmitted; otherwise, it is not transmitted.

Herein, the terminal UE transmitting the triggered error level indication information and the HARQ acknowledgment information, or the triggered channel quality indication information and the HARQ acknowledgment information to the base station through the PUCCH or the PUSCH includes: if the terminal transmits a data shared channel on an nth subframe, transmitting the triggered channel quality indication information of one or two transport blocks of the data shared channel through a PUCCH or a PUSCH on an (n+k)th subframe, where n is any positive integer and k is a fixed value or a value in a set of not more than 10 fixed values. Further, only when the HARQ acknowledgment information is an ACK, the error level indication information or the triggered channel quality indication information is transmitted; otherwise, it is not transmitted.

Further, downlink grant for the data shared channel includes a request indication field. If the indication field is 1, feedback of the error level indication information and the HARQ acknowledgment information is triggered, or feedback of the triggered channel quality indication information and the HARQ acknowledgement information is triggered; and if the indication field is reserved or is 0, the feedback information is not triggered.

Further, uplink grant corresponding to the PUSCH includes a request indication field. If the indication field is 1, feedback of the error level indication information and the HARQ acknowledgment information is triggered, or feedback of the triggered channel quality indication information and the HARQ acknowledgement information is triggered; and if the indication field is reserved or is 0, the feedback information is not triggered.

Herein the terminal UE transmitting the error level indication information and the HARQ acknowledgment information, or the triggered channel quality indication information and the HARQ acknowledgment information to the base station through the PUCCH or the PUSCH includes: if the terminal transmits downlink grant on an nth subframe, transmitting the triggered channel quality indication information of one or two transport blocks of the data shared channel corresponding to the downlink grant through a PUCCH or a PUSCH on an (n+k)th subframe, where n is any positive integer and k is a fixed value or a value in a set of not more than 10 fixed values. Further, only when the HARQ acknowledgment information is an ACK, the error level indication information or the triggered channel quality indication information is transmitted; otherwise, it is not transmitted.

Further, the downlink grant includes a request indication field. If the indication field is 1, feedback of the error level indication information and the HARQ acknowledgment information is triggered, or feedback of the triggered channel quality indication information and the HARQ acknowledgement information is triggered; and if the indication field is reserved or is 0, the feedback information is not triggered.

Herein the terminal UE transmitting the error level indication information and the HARQ acknowledgment information, or the triggered channel quality indication information and the HARQ acknowledgment information to the base station through the PUSCH includes: the terminal simultaneously transmitting the HARQ acknowledgment information and the error level indication information, or the triggered channel quality indication information and the HARQ acknowledgment information on an $n^{th}$ subframe.

Herein the UE only transmits the error level indication information and the HARQ acknowledgment information of the retransmission or the triggered channel quality indication information and the HARQ acknowledgment information to the base station, or the terminal UE transmits the error level indication information and the HARQ acknowledgment information of each transmission to the base station.

Alternatively, the above-described solution may further include the transmission module transmitting CQI information to the base station.

Both of the above-mentioned receiving module and transmission module can be realized by hardware such as DSP, FPGA, ASIC, CPU cooperatively. The above determination unit can be realized by hardware such as DSP, FPGA, ASIC, CPU.

With the above solution, the base station can quickly adjust the modulation and coding scheme MCS according to the data transmission level indication information transmitted by the terminal. Furthermore, fast OLLA is achieved, the performance of the existing HARQ is compatible and improved, and the existing feedback signaling design is compatible and signaling overhead is maintained to a minimum. In summary, the invention improves the effect of the link adaptation of the system on the basis of a small amount of uplink feedback signaling, and finally provides the system capacity and spectral efficiency of the mobile communication system.

Apparatus Embodiment Two

Figure 15:
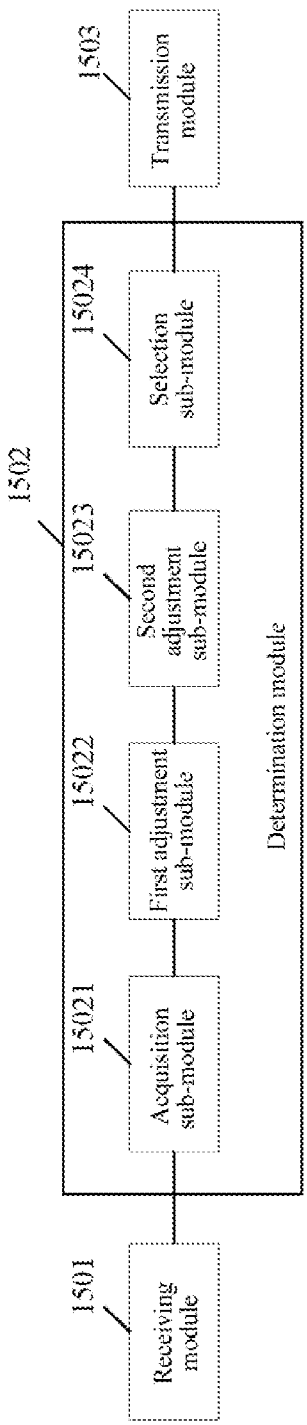
FIG. 15 is a constitutional structural diagram of a second transmission node according to an embodiment of the present invention.

The embodiment of the present invention provides a transmission node, as shown in FIG. 15, including:

a receiving module 1501 configured to receive data transmission level indication information corresponding to a transport block transmitted by a first transmission node; and a determination module 1502 configured to determine a Modulation and Coding Scheme (MCS) or a number K of retransmissions of data information according to the data transmission level indication information.

The base station further includes: a transmission module 1503 configured to, after determining the MCS of the transport block, perform coding on the data indication information using the determined MCS to acquire bits of data information, and transmit the bits of the data information to a User Equipment (UE).

Herein, the data transmission level indication information refers to level information when data is transmitted wrongly, and includes one of the following: triggered error level indication information, triggered channel quality indication information, triggered power parameter level indication information, triggered repetition level indication information, triggered blind-detectable Acknowledgement (ACK) information, soft ACK/Negative Acknowledgement (NACK) information, indication information of joint coding of triggered channel quality level information or a triggered power parameter level or a triggered repetition number level and ACK positive acknowledgement information, or indication information of joint coding of triggered channel quality level information or a triggered power parameter level or a triggered repetition number level and Hybrid Automatic Repeat Request (HARQ) acknowledgment information; herein the soft ACK/NACK information is indication information of joint coding of the error level indication information and the ACK.

The receiving unit 1501 is configured to receive Channel Quality Indication (CQI) information transmitted by the first transmission node, and determine a modulation and coding scheme of the data information according to the data transmission level Indication information.

The data information includes one of the following: a transport block, a set of erroneous code blocks of the transport block, and redundant packets obtained by performing packet coding on a system code of the transport block.

The data transmission level indication information includes code block set error pattern level indication information; and the determination module 1502 is configured to determine a set of erroneous code blocks of the transport block according to the code block set error pattern level indication information, wherein the data information is the set of erroneous code blocks of the transport block.

The determination module 1502 is configured to, if the packet error rate or the code block error rate is lower than a threshold P0, perform packet coding on a system code of K0 data packets of the transport block by the second transmission node to acquire M0 redundant packets, herein the data information is the M0 redundant packets; and if the packet error rate is higher than a threshold value, not perform packet coding, herein the data information is the transport block.

The transport block and the X0 padding bits can be divided into K0 data packets of the same size, K0 and M0 are positive integers greater than or equal to 1, and X0 is an integer greater than or equal to 0; and the data transmission level indication information includes packet error rate or code block error rate level indication information.

The error level indication information is used to indicate level information of an error degree and/or error pattern, which includes at least one of the following: bit error rate level indication information, code block error rate level indication information, packet error rate level indication information, code block set error pattern level indication information, code block error number indication information, and packet error number indication information.

The error level indication information indicates N levels, and different error level indication information indicates different error rate ranges; herein an error rate range is defined by an error rate threshold, and different error rate thresholds are fixed or are semi-statically configured by a base station; and N is a positive integer greater than or equal to 2.

The error level indication information indicates N levels, and different error level indication information indicates different code block set error pattern levels; and a transport block is divided into M code blocks which are divided into N0 sets, and the code block set error pattern level indication information is used to indicate whether each code block set is decoded wrongly or indicate the number of erroneous code block sets; herein if at least one code block in a code block set is erroneous, the code block set is an erroneous code block set.

The triggered error level indication information, the channel quality indication information, the power parameter level indication information, or the repetition number level indication information is level indication information triggered by the data shared channel or HARQ acknowledgment information or downlink grant information.

The triggered channel quality indication information indicates M levels, different channel quality indication information indicates different adjusted channel quality indication levels or channel quality indication levels; herein a step for adjusting the CQI is fixed or is semi-statically configured by a base station; herein M is a positive integer greater than or equal to 2.

The triggered channel quality indication information is a required channel quality indication level or a channel quality indication level required to be adjusted for correctly receiving or receiving a transport block at a target error rate by the first transmission node on a corresponding resource of the data shared channel.

The triggered power parameter level indication information is a power parameter level in a unit of dB required to be adjusted for correctly receiving or receiving the transport block at a target error rate by the first transmission node on a corresponding resource of the data shared channel.

The triggered repetition number level indication information is a retransmission number or a retransmission number required to be adjusted for correctly receiving or receiving the transport block at a target error rate by the first transmission node on a corresponding resource of the data shared channel.

The transmission module 1503 is configured to receive the data transmission level indication information corresponding to the transport block transmitted by the first transmission node through the data shared channel or a control channel.

The transmission module 1503 is configured to receive the triggered error level indication information, the triggered channel quality indication information, the triggered power parameter level indication information, or the triggered repetition number level indication information together with the HARQ acknowledgment information transmitted by the first transmission node through the data shared channel; or receive, by a node, indication information of joint coding of the triggered error level indication information, the triggered channel quality indication information, the triggered power parameter level indication information, or the triggered repetition number level indication information and the ACK or the HARQ acknowledgement information transmitted by the first transmission node through the control channel.

The transmission module 1503 is configured to, if the second transmission node receives the HARQ acknowledgement information through a control channel on an $n^{th}$ subframe, receive the triggered error level indication information, the triggered channel quality indication information, the triggered power parameter level indication information, or the triggered repetition number level indication information through another control channel or data shared channel on an $(n+k)^{th}$ subframe, where n is any positive integer and k is a fixed value or a value in a set of not more than 10 fixed values.

The transmission module 1503 is configured to, if the second transmission node receives the transport block through the data shared channel on an nth subframe, receive the triggered error level indication information, the triggered channel quality indication information, the triggered power parameter level indication information, or the triggered repetition number level indication information through another control channel or data shared channel on an (n+k)th subframe, where n is any positive integer and k is a fixed value or a value in a set of not more than 10 fixed values.

The transmission module 1503 is configured to, if a request indication field is 1, trigger feedback of the error level indication information, the channel quality indication information, the power parameter level indication information, the repetition number level indication information together with the HARQ acknowledgement information, and if the request indication field is reserved or is 0, not trigger the feedback information, herein an grant control information format corresponding to the data shared channel includes the request indication field.

The transmission module 1503 is configured to, if the second transmission node receives an grant control information format through the control channel on an nth subframe, receive trigged channel quality indication level information of one or two transport blocks of the data shared channel corresponding to the downlink grant through a PUCCH or PUSCH on an (n+k)th subframe, where n is any positive integer and k is a fixed value or a value in a set of not more than 10 fixed values.

The transmission module 1503 is configured to, if a request indication field is 1, trigger feedback of the error level indication information, the channel quality indication information, the power parameter level indication information, the repetition number level indication information together with the HARQ acknowledgement information, and if the request indication field is reserved or is 0, not trigger the feedback information, herein the grant control information format includes the request indication field.

The transmission module 1503 is configured to receive the HARQ acknowledgment information and one of the following on an $n^{th}$ subframe simultaneously: the error level indication information, the channel quality indication information, the power parameter level indication information and the repetition number level indication information.

The determination module 1502 is configured to predict an initial Signal to Interference Plus Noise Ratio (SINR) 0 according to the CQI information; in a first adjustment period, perform adjustment of a first time on the SINR0 according to the HARQ acknowledgment information in the data transmission level indication information to acquire SINR1 as SINR0 after the adjustment of the first time; in a second adjustment period, perform adjustment of a second time on the SINR0 according to the data transmission level indication information to acquire SINR2; and determine the MCS of the data information according to the SINR2 acquired after the adjustment of the second time and according to a preset SINR and MCS correspondence table.

Herein the data transmission level indication information includes at least one of the following: the triggered error level indication information, the triggered channel quality indication information, and the triggered power parameter level indication information.

The determination module 1502 is configured to predict an initial SINR0 according to the CQI information; perform adjustment of the second time on the SINR0 according to the data transmission level indication information to acquire SINR2; and determine the MCS of the data information according to the SINR2 acquired after the adjustment and according to a preset SINR and MCS correspondence table.

Herein the data transmission level indication information includes at least one of the following: the triggered error level indication information, the triggered channel quality indication information, and the triggered power parameter level indication information.

The determination module 1502 is configured to adjust SINR0 according to the data transmission level indication information to acquire SINR2; and determine the MCS of the data information according to the SINR2 acquired after the adjustment and according to a preset SINR and MCS correspondence table.

Herein the data transmission level indication information includes at least one of the following: the triggered error level indication information, the triggered channel quality indication information, and the triggered power parameter level indication information.

The determination module 1502 is configured to perform modulation and coding at a predefined MCS level to acquire bits of code words and retransmit the bits of the code words to the first transmission node for K times according to repetition number level indication information in the data transmission level indication information.

Herein the data transmission level indication information includes at least one of the following: the triggered error level indication information, the triggered channel quality indication information, and the triggered power parameter level indication information.

The determination module 1502 is configured to detect the positive acknowledgment ACK information on a preset candidate resource, if the information is not detected, perform modulation and coding at a predefined MCS level to acquire bits of code words, retransmit the bits of the code words to the first transmission node all the time, and if the information is detected, stop retransmission of the data.

Herein the data transmission level indication information at least includes the triggered blind-detectable positive acknowledgement ACK information.

Further, the determination module 1502 includes: an acquisition sub-module 15021, a first adjustment sub-module 15022, a second adjustment sub-module 15023 and a selection sub-module 15024.

Herein the acquisition sub-module 15021 is configured to predict an initial Signal to Interference Plus Noise Ratio (SINR) 0 according to the CQI information; the first adjustment sub-module 15022 is configured to determine a first adjustment signal-to-noise ratio ΔSINR1 according to the HARQ acknowledgment information of the data transmission level indication information transmitted by the terminal, and adjust the predicted SINR1=SINR0+ΔSINR1 in a period T1, herein T1 is a first time length; the second adjustment sub-module 15023 is configured to determine a second adjustment signal-to-noise ratio ΔSINR2 according to the error level indication information or the Channel Quality Indication (CQI) information of the data transmission level indication information transmitted by the terminal, and adjust the predicted SINR2=SINR1+ΔSINR2 in a period T2, wherein T2 is a second time length, and T2 is less than T1; and the selection sub-module 15024 is configured to select a suitable MCS according to the adjusted predicted SIN2 and a correspondence relationship between the SINR and the MCS.

Further, the determination module may only include the acquisition sub-module, the second adjustment sub-module and the selection sub-module.

Both of the above-mentioned receiving module and transmission module can be realized by hardware such as DSP, FPGA, ASIC, CPU etc. The above determination unit can be realized by hardware such as DSP, FPGA, ASIC, CPU etc.

In summary, with the solution according to an embodiment of the present invention, it ensures that the system realizes more rapid link adaptation under the condition of adding some uplink feedback signaling overhead, which is beneficial for reducing the system delay, facilitating high-speed data transmission. and improving the system performance.

Figure 16:
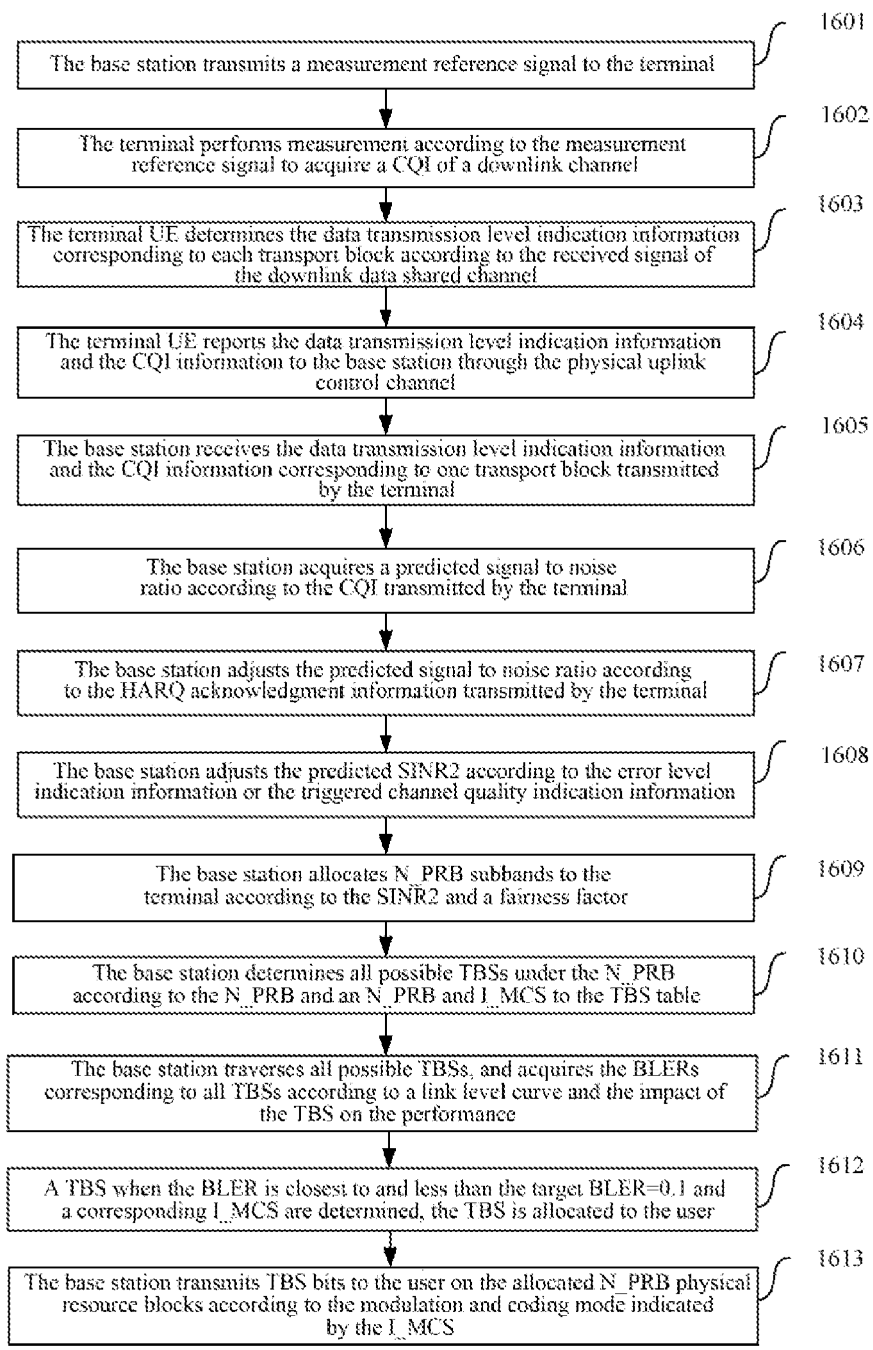
FIG. 16 is a flowchart of a method for processing feedback information according to an embodiment of the present invention.

Hereinafter, in the present embodiment, the base station and the terminal provide a complete link adaptation process through their own processing and a mutual interaction process. A terminal is responsible for generating and transmitting a CQI, HARQ acknowledgment information and error level indication information, and the base station completes the scheduling of the terminal according to the transmission information to achieve the best transmission scheme from the base station to the terminal, as shown in FIG. 16:

In step 1601, the base station transmits a CSI-RS and/or CRS to the terminal;

in step 1602, the terminal performs channel measurement and/or interference measurement according to the CSI-RS or CRS, and then performs CQI calculation to acquire a CQI of a downlink channel;

in step 1603, the terminal UE determines the data transmission level indication information corresponding to each transport block according to the received signal of the downlink data shared channel;

in step 1604, the terminal UE transmits the data transmission level indication information and the CQI information to the base station through the physical uplink control channel;

in step 1605, the base station receives the data transmission level indication information and the CQI information corresponding to one transport block transmitted by the terminal;

in step 1606, the base station acquires a predicted SINR0 according to the CQI transmitted by the terminal;

in step 1607, the base station adjusts the predicted SINR according to the HARQ acknowledgment information in the data level indication information transmitted by the terminal to acquire SINR1=SINR0+ΔSNR1;

in step 1608, the base station adjusts the predicted SINR according to the error level indication information or the triggered channel quality indication in the data level indication information transmitted by the terminal to acquire SINR2=SINR1+ΔSNR2;

in step 1609, the base station allocates N_PRB subbands to the terminal according to the adjusted predicted SINR2 and a fairness factor;

in step 1610, the base station determines all possible TBSs under the N_PRB according to the N_PRB and an N_PRB and I_MCS to the TBS table in the LTE protocol;

in step 1611, the base station traverses all possible TBSs, and acquires the BLERs corresponding to all TBSs according to a link level curve when the spectrum efficiency is the maximum code length of the TBS/N_PRB and the impact of the TBS on the performance;

in step 1612, a TBS when the BLER is closest to and less than the target BLER=0.1 and a corresponding I_MCS are determined, the TBS is allocated to the user; and in step 1613, the base station transmits TBS information bits to the user on the allocated N_PRB physical resource blocks according to the modulation and coding mode indicated by the I_MCS.

The present disclosure further provides a system for processing feedback information. The system includes a first transmission node and a second transmission node.

The first transmission node is configured to receive a signal of a data shared channel, determine data transmission level indication information of a transport block according to the signal, and transmit the data transmission level indication information corresponding to the transport block to a second transmission node.

The second transmission node is configured to receive the data transmission level indication information of the transport block transmitted by the first transmission node, and determine a Modulation and Coding Scheme (MCS) of data information or a number K of retransmissions according to the data transmission level indication information.

The above description is only the embodiments of the present invention and is not intended to limit the present invention. For those skilled in the art, the invention can have various modifications and variations. Any of modification, equivalent and improvement etc., which is made within the essence and principle of the present invention, should be contained within the scope of the claims of the present invention.

INDUSTRIAL APPLICABILITY

With the solution according to the embodiments of the present invention, there is provided a method of transmitting a data error level on the basis of compatibility with existing HARQ acknowledgment information feedback in the case of a small increase of uplink feedback control signaling overhead. According to the transmitted HARQ acknowledgment information and the data error level, the base station can quickly give an offset value of the predicted SINR for adjusting the predicted SINR with the CQI being given and thereby adjusting the modulation and coding scheme MCS quickly according to the information, herein an adjustment period can even be reduced from several tens milliseconds to several hundred milliseconds to less than ten milliseconds. The invention has the following advantages. Firstly, fast link adaptation is realized to overcome the problem of inaccuracy of the CQI prediction; secondly, it is compatible with the existing HARQ scheme and improves the performance and efficiency of the existing HARQ; and finally, the small signaling overhead is guaranteed. In summary, the link adaptation technology of the present invention can effectively meet the requirements of a wireless communication link for link adaptation in scenarios such as fast channel change (especially for mobile networks), traffic data burst, interference data burst, cell handover, etc.

The above description is only the preferable embodiments of the present invention and is not intended to limit the protection scope of the present invention.

What is claimed is:

1. A method for processing feedback information, applied in a first transmission node, comprising:

receiving, by the first transmission node, a signal of a data shared channel;

determining data transmission level indication information of a transport block according to the signal, wherein the data transmission level indication information indicates a data transmission level; and transmitting, by the first transmission node, the data transmission level indication information corresponding to the transport block to a second transmission node, wherein the data transmission level indication information comprises any one or more of the following:

triggered error level indication information, triggered channel quality indication information, triggered repetition level indication information, triggered blind-detectable Acknowledgement (ACK) information, soft ACK/Negative Acknowledgement NACK information, joint-coded indication information of a triggered channel quality level or triggered repetition number level and an ACK positive acknowledgement, or joint-coded indication information of a triggered channel quality level information or triggered repetition number level and a Hybrid Automatic Repeat Request (HARQ) acknowledgment;

wherein the soft ACK/NACK information is joint-coded indication information of the error level information and the ACK, wherein the blind-detectable ACK refers to that the second transmission node is configured to detect a resource, wherein the resource is configured to at least carry the ACK information to be detected by the second transmission node on the resource in response to the first transmission node transmitting an ACK information, wherein the resource is configured to carry other control information or data in response to the first transmission node not transmitting the ACK information, wherein, for the data shared channel, the first transmission node is configured to only transmit the ACK acknowledgment information and cannot transmit NACK acknowledgment information, wherein the triggered error level indication information is used to indicate level information of an error degree when data of the transport block is decoded erroneously, and wherein the level information comprises at least one of the following: code block error rate level information, packet error rate level information, code block error number level information, or packet error number level information.

2. The method according to claim 1, wherein the triggered channel quality indication information or the triggered repetition number level indication information is level indication information triggered by the data shared channel or HARQ acknowledgment information or downlink grant information.

3. The method according to claim 1, wherein the triggered channel quality indication information is divided into M levels, different channel quality indication information indicates different adjusted channel quality indication (CQI) levels (Δ CQI levels) or channel quality indication levels, which are acquired according to a channel measurement or a channel measurement and an interference measurement of the data shared channel or a user-specific pilot corresponding to the data shared channel;

wherein a step for adjusting a CQI is a fixed step or is semi-statically configured by a base station; and wherein M is a positive integer greater than or equal to 2.

4. The method according to claim 1, wherein the triggered channel quality indication information is used to, on condition of true transmission of the data shared channel and in a case of all conditions being unchanged except allowing a transport block size and a modulation and coding scheme changeable, determine a channel quality level which is adjusted corresponding to a modulation and coding level required to be adjusted to receive a transport block at a target error rate P on a corresponding resource of the data shared channel, wherein P is a real number between 0 and 1, or wherein the triggered repetition number indication information is used to on condition of true transmission of the data shared channel and in a case of all conditions being unchanged except allowing a retransmission number changeable, determine a retransmission number required to be adjusted to receive the transport block at a target error rate P on a corresponding resource of the data shared channel, wherein P is a real number between 0 and 1.

5. The method according to claim 1, wherein the first transmission node transmitting data transmission level indication information corresponding to the transport block to a second transmission node comprises:

transmitting, by the first transmission node, the data transmission level indication information to the second transmission node through the data shared channel or a control channel, and, wherein the first transmission node transmitting the triggered channel quality indication information, or the triggered repetition number level indication information together with the HARQ acknowledgment information to the second transmission node through the data shared channel; or the first transmission node transmitting joint-coded indication information of the triggered channel quality indication information, or the triggered repetition number level indication information and the ACK to the second transmission node through the control channel.

6. The method according to claim 5, wherein the transmitting the data transmission level indication information to the second transmission node through the data shared channel or the control channel comprises: if the first transmission node transmits the HARQ acknowledgement information through a control channel on an $n^{th}$ subframe, transmitting the triggered channel quality indication information, or the triggered repetition number level indication information through another control channel or data shared channel on an $n+k^{th}$ subframe, wherein n is any positive integer and k is a fixed value or a value in a set of not more than 10 fixed values, or, wherein the first transmission node transmitting the data transmission level indication information to the second transmission node through the data shared channel or the control channel comprises: if the terminal transmits the transport block through the data shared channel on an $n^{th}$ subframe, transmitting the triggered channel quality indication information, or the triggered repetition number level indication information through another control channel or data shared channel on an $n+k^{th}$ subframe, wherein n is any positive integer and k is a fixed value or a value in a set of not more than 10 fixed values, or, wherein the first transmission node transmitting the data transmission level indication information to the second transmission node through the data shared channel or the control channel comprises:

if a request indication field is 1, triggering feedback of the channel quality indication information the triggered repetition number level indication information together with the HARQ acknowledgement information, and if the request indication field is reserved or is 0, not triggering the feedback information, wherein an grant control information format corresponding to the data shared channel comprises the request indication field, or, wherein the first transmission node transmitting the data transmission level indication information to the second transmission node through the data shared channel or the control channel comprises: if the terminal transmits an grant control information format through the control channel on an $n^{th}$ subframe, transmitting trigged channel quality indication information of one or two transport blocks of the data shared channel corresponding to the downlink grant through the control channel or the data shared channel on an $n+k^{th}$ subframe, wherein n is any positive integer and k is a fixed value or a value in a set of not more than 10 fixed values, or, wherein the first transmission node transmitting the data transmission level indication information to the second transmission node through the data shared channel or the control channel comprises:

if a request indication field is 1, triggering feedback of the channel quality indication information, the triggered repetition number level indication information together with the HARQ acknowledgement information, and if the request indication field is reserved or is 0, not triggering the feedback information, wherein the grant control information format comprises the request indication field, or, wherein the first transmission node transmitting the data transmission level indication information to the second transmission node through the data shared channel or the control channel comprises: the terminal transmitting the HARQ acknowledgment information and one of the following on an $n^{th}$ subframe simultaneously:, the channel quality indication information, and the triggered repetition number level indication information.

7. A method for processing feedback information, applied in a second transmission node, comprising:

receiving, by the second transmission node, data transmission level indication information of a transport block transmitted by a first transmission node; and determining, by the second transmission node, a Modulation and Coding Scheme (MCS) or a number K of retransmissions of data information according to the data transmission level indication information, wherein the data transmission level indication information indicates data transmission level information, wherein the data transmission level indication information is acquired according to a data shared channel, and K is an integer greater than or equal to 1, wherein the data transmission level indication information comprises any one or more of the following:

triggered error level indication information, triggered channel quality indication information, triggered repetition level indication information, triggered blind-detectable Acknowledgement (ACK) information, soft ACK/Negative Acknowledgement NACK information, joint-coded indication information of a triggered channel quality level or triggered repetition number level and an ACK positive acknowledgement, or joint-coded indication information of a triggered channel quality level information or triggered repetition number level and a Hybrid Automatic Repeat Request (HARQ) acknowledgment;

wherein the soft ACK/NACK information is joint-coded indication information of the error level information and the ACK, wherein the blind-detectable ACK refers to that the second transmission node is configured to detect a resource, wherein the resource is configured at least carry the ACK information to be detected by the second transmission node on the resource in response to the first transmission node transmitting the ACK information, wherein the resource is configured to carry other control information or data in response to the first transmission node not transmitting the ACK information, wherein, for the data shared channel, the first transmission node is configured to only transmit the ACK acknowledgment information and cannot transmit NACK acknowledgment information, wherein the triggered error level indication information is used to indicate level information of an error degree when data of the transport block is decoded erroneously, and wherein the level information comprises at least one of the following: code block error rate level information, packet error rate level information, code block error number level information, or packet error number level information.

8. The method according to claim 7, wherein after determining the MCS of the transport block, the method further comprises: performing modulation and coding on the data information using the determined MCS to acquire a sequence of modulated symbols, and transmitting the sequence of modulated symbols to the first transmission node.

9. The method according to claim 7, further comprising: the second transmission node receiving Channel Quality Indication (CQI) information transmitted by the first transmission node, wherein the second transmission node further needs to determine a modulation and coding scheme of the data information according to the data transmission level Indication information.

10. The method according to claim 8, wherein the channel quality indication information, or the triggered repetition number level indication information is level indication information triggered by the data shared channel or HARQ acknowledgment information or downlink grant information.

11. The method according to claim 8, wherein the triggered channel quality indication information indicates M levels, different channel quality indication information indicates different adjusted channel quality indication levels or channel quality indication levels, which are acquired according to a channel measurement or a channel measurement and an interference measurement of the data shared channel or a user-specific pilot corresponding to the data shared channel; wherein a step for adjusting the CQI is fixed or is semi-statically configured by a base station; wherein M is a positive integer greater than or equal to 2.

12. The method according to claim 8, wherein the triggered channel quality indication information is used to on condition of true transmission of the data shared channel and in a case of all conditions being unchanged except allowing a transport block size and a modulation and coding scheme changeable, determine a channel quality level which is adjusted corresponding to a modulation and coding level required to be adjusted to receive a transport block at a target error rate P on a corresponding resource of the data shared channel, wherein P is a real number between 0 and 1, or wherein the triggered repetition number level indication information is used to on condition of true transmission of the data shared channel and in a case of all conditions being unchanged except allowing a retransmission number changeable, determine a retransmission number required to be adjusted to receive the transport block at a target error rate P on a corresponding resource of the data shared channel, wherein P is a real number between 0 and 1.

13. The method according to claim 8, wherein the second transmission node receiving data transmission level indication information corresponding to the transport block transmitted by the first transmission node comprises:

the second transmission node receiving the data transmission level indication information corresponding to the transport block transmitted by the first transmission node through the data shared channel or a control channel, and, wherein the second transmission node receiving the triggered channel quality indication information or the triggered repetition number level indication information together with the HARQ acknowledgment information transmitted by the first transmission node through the data shared channel; or the second transmission node receiving joint-coded indication information of, the triggered channel quality indication information, or the triggered repetition number level information and the ACK or the HARQ acknowledgement information transmitted by the first transmission node through the control channel.

14. The method according to claim 13, wherein the second transmission node receiving the data transmission level indication information transmitted by the first transmission node through the data shared channel or the control channel comprises: if the second transmission node receives the HARQ acknowledgement information through a control channel on an $n^{th}$ subframe, receiving the triggered channel quality indication information or the triggered repetition number level indication information through another control channel or data shared channel on an $n+k^{th}$ subframe, wherein n is any positive integer and k is a fixed value or a value in a set of not more than 10 fixed values, or wherein the second transmission node receiving the data transmission level indication information transmitted by the first transmission node through the data shared channel or the control channel comprises: if the second transmission node receives the transport block through the data shared channel on an $n^{th}$ subframe, receiving, the triggered channel quality indication information or the triggered repetition number level indication information through another control channel or data shared channel on an $n+k^{th}$ subframe, wherein n is any positive integer and k is a fixed value or a value in a set of not more than 10 fixed values.

15. The method according to claim 13, wherein the second transmission node receiving the data transmission level indication information transmitted by the first transmission node through the data shared channel or the control channel comprises:

if a request indication field is 1, triggering feedback of the channel quality indication information, the triggered repetition number level indication information together with the HARQ acknowledgement information, and if the request indication field is reserved or is 0, not triggering the feedback information, wherein an grant control information format corresponding to the data shared channel comprises the request indication field, or wherein the second transmission node receiving the data transmission level indication information transmitted by the first transmission node through the data shared channel or the control channel comprises: if the second transmission node receives an grant control information format through the control channel on an $n^{th}$ subframe, receiving trigged channel quality indication information of one or two transport blocks of the data shared channel corresponding to the downlink grant through another control channel or the data shared channel on an $n+k^{th}$ subframe, wherein n is any positive integer and k is a fixed value or a value in a set of not more than 10 fixed values or, wherein the second transmission node receiving the data transmission level indication information transmitted by the first transmission node through the data shared channel or the control channel comprises: if a request indication field is 1, triggering feedback of the channel quality indication information, the triggered repetition number level indication information together with the HARQ acknowledgement information, and if the request indication field is reserved or is 0, not triggering the feedback information, wherein the grant control information format comprises the request indication field or, wherein the second transmission node receiving the data transmission level indication information transmitted by the first transmission node through the data shared channel or the control channel comprises: the terminal receiving the HARQ acknowledgment information and one of the following on an $n^{th}$ subframe simultaneously: the channel quality indication information the triggered repetition number level indication information.

16. The method according to claim 7, wherein after said determining the MCS of the transport block, the method further comprises:

performing modulation and coding at a predefined MCS level to acquire a sequence of modulated symbols and retransmitting the sequence of modulated symbols to the first transmission node for K times according to the repetition number, or, wherein after said determining the MCS of the transport block, the method further comprises:

detecting the positive acknowledgment information ACK on a preset candidate resource, if the information is not detected, performing modulation and coding at a predefined MCS level to acquire a sequence of modulated symbols, and retransmitting the sequence of modulated symbols to the first transmission node all the time, and if a blind-detectable ACK is detected or a maximum allowable retransmission number is achieved, stopping retransmission of the data;

wherein the data transmission level indication information comprises the triggered blind-detectable acknowledgement (ACK) information.

17. A transmission node, comprising a processor configured to perform instructions stored in a non-transitory computer readable medium which when executed, configures the processor to:

receive a signal of a data shared channel;

determine data transmission level indication information of a transport block according to the signal; and transmit the data transmission level indication information corresponding to the transport block to a second transmission node; wherein the data transmission level indication information comprises any one or more of the following:

triggered error level indication information, triggered channel quality indication information, triggered repetition level indication information, triggered blind-detectable Acknowledgement (ACK) information, soft ACK/Negative Acknowledgement NACK information, joint-coded indication information of a triggered channel quality level or triggered repetition number level and an ACK positive acknowledgement, or joint-coded indication information of a triggered channel quality level information or triggered repetition number level and a Hybrid Automatic Repeat Request (HARQ) acknowledgment;

wherein the soft ACK/NACK information is joint-coded indication information of the error level information and the ACK, wherein the blind-detectable ACK refers to that the second transmission node can detect a resource, wherein the resource is configured to at least carry the ACK information to be detected by the second transmission node on the resource in response to the first transmission node being configured to transmit an ACK information, wherein the resource is configured to carry other control information or data in response to the first transmission node configured to not transmit the ACK information, wherein, for the data shared channel, the first transmission node is configured to only transmit the ACK acknowledgment information and cannot transmit NACK acknowledgment information, wherein the triggered error level indication information is used to indicate level information of an error degree when data of the transport block is decoded erroneously, and wherein the level information comprises at least one of the following: code block error rate level information, packet error rate level information, code block error number level information, or packet error number level information.

18. A transmission node, comprising a processor configured to perform instructions stored in a non-transitory computer readable medium which when executed, configures the processor to:

receive data transmission level indication information of a transport block transmitted by a first transmission node; and determine a Modulation and Coding Scheme (MCS) or a number K of retransmissions of data information according to the data transmission level indication information, wherein K is greater than or equal to 1;

wherein the data transmission level indication information comprises at any one or more of the following:

triggered error level indication information, triggered channel quality indication information, triggered repetition level indication information, triggered blind-detectable Acknowledgement (ACK) information, soft ACK/Negative Acknowledgement NACK information, joint-coded indication information of a triggered channel quality level or triggered repetition number level and an ACK positive acknowledgement, or joint-coded indication information of a triggered channel quality level information or triggered repetition number level and a Hybrid Automatic Repeat Request (HARQ) acknowledgment;

wherein the soft ACK/NACK information is joint-coded indication information of the error level information and the ACK, wherein the blind-detectable ACK refers to that the second transmission node can detect a resource, wherein the resource is configured to at least carry the ACK information to be detected by the second transmission node on the resource in response to the first transmission node being configured to transmit the ACK information, wherein the resource is configured to carry other control information or data in response to the first transmission node being configured to not transmit the ACK information, wherein, for the data shared channel, the first transmission node is configured to only transmit the ACK acknowledgment information and cannot transmit NACK acknowledgment information, wherein the triggered error level indication information is used to indicate level information of an error degree when data of the transport block is decoded erroneously, and wherein the level information comprises at least one of the following: code block error rate level information, packet error rate level information, code block error number level information, or packet error number level information.

* * * * *